US006680843B2

(12) United States Patent
Farrow et al.

(10) Patent No.: US 6,680,843 B2
(45) Date of Patent: Jan. 20, 2004

(54) ALL-IN-ONE PERSONAL COMPUTER WITH TOOL-LESS QUICK-RELEASE FEATURES FOR VARIOUS ELEMENTS THEREOF INCLUDING A REUSABLE THIN FILM TRANSISTOR MONITOR

(75) Inventors: Timothy Samuel Farrow, Apex, NC (US); Dean Frederick Herring, Youngsville, NC (US); Mark John Lawrence, Cary, NC (US); Brian Hargrove Leonard, Durham, NC (US); Bruce Wayne Rasa, Raleigh, NC (US); James Stephen Rutledge, Durham, NC (US); John David Swansey, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/118,809

(22) Filed: Apr. 9, 2002

(65) Prior Publication Data

US 2003/0063432 A1 Apr. 3, 2003

Related U.S. Application Data

(60) Provisional application No. 60/325,567, filed on Sep. 28, 2001.

(51) Int. Cl.[7] .................................................. G06F 1/16
(52) U.S. Cl. ......................................... 361/681; 361/683
(58) Field of Search ............................... 361/681–683; 312/223.1, 223.2; 395/169, 905

(56) References Cited

U.S. PATENT DOCUMENTS

| 3,637,981 A | * | 1/1972 | Swimmer ................... 392/423 |
| 4,294,496 A | | 10/1981 | Murez |
| 4,669,053 A | | 5/1987 | Krenz |
| 4,982,303 A | | 1/1991 | Krenz |
| 5,021,922 A | | 6/1991 | Davis et al. |

(List continued on next page.)

OTHER PUBLICATIONS

IBM, IBM NetVista X40, 2 pages, Oct. 2000.*
UNKNOWN, "Base–Plate Structure for Slim Disk Drive," IBM Technical Disclosure Bulletin, p. 275, (Jun. 1995).

(List continued on next page.)

*Primary Examiner*—Darren Schuberg
*Assistant Examiner*—Anthony Q. Edwards
(74) *Attorney, Agent, or Firm*—George E. Grosser

(57) ABSTRACT

A unitary personal computer system in information handling elements of the system such as the central processor, associated memory, drives and options such as modems or network interface cards are housed in a common housing with the display or monitor. Provision is made for access to the information handling elements of the system by release of manually actuable latches and the like and for mounting of the information handling elements in ways which facilitate orderly and attractive use, such as by providing smooth transitions between stowed and active positions and ready adjustment of positions.

10 Claims, 37 Drawing Sheets

U.S. PATENT DOCUMENTS

| | | | |
|---|---|---|---|
| 5,097,388 A | | 3/1992 | Buist et al. |
| 5,124,887 A | | 6/1992 | Kobayashi |
| 5,294,994 A | * | 3/1994 | Robinson et al. ............ 348/825 |
| 5,331,506 A | | 7/1994 | Nakajima |
| 5,332,115 A | | 7/1994 | Schafer |
| 5,495,389 A | | 2/1996 | Dewitt et al. |
| 5,566,383 A | | 10/1996 | Gilden et al. |
| 5,654,846 A | | 8/1997 | Wicks et al. |
| 5,691,880 A | | 11/1997 | Seto et al. |
| 5,764,480 A | | 6/1998 | Crump et al. |
| 5,784,251 A | | 7/1998 | Millet et al. |
| 5,784,252 A | | 7/1998 | Villa et al. |
| 5,808,864 A | | 9/1998 | Jung |
| 5,813,793 A | | 9/1998 | Baucom |
| 5,815,379 A | | 9/1998 | Mundt |
| 5,918,956 A | | 7/1999 | Scholder |
| 5,999,416 A | | 12/1999 | McAnally et al. |
| 6,130,822 A | | 10/2000 | Della Fiora et al. |
| 6,188,569 B1 | | 2/2001 | Minemoto et al. |
| 6,216,999 B1 | | 4/2001 | Olson et al. |
| 6,233,152 B1 | | 5/2001 | Abbott et al. |
| 6,262,883 B1 | | 7/2001 | Kim |
| 6,272,009 B1 | | 8/2001 | Bulcan et al. |
| 6,297,592 B1 | | 10/2001 | Goren et al. |
| 6,297,948 B1 | | 10/2001 | Bulcan et al. |
| 6,301,099 B1 | | 10/2001 | Felcman et al. |
| 6,307,742 B1 | | 10/2001 | Diaz et al. |
| 6,359,775 B1 | * | 3/2002 | Revis ......................... 361/683 |
| 6,366,452 B1 | * | 4/2002 | Wang et al. ................. 361/681 |
| 6,519,146 B2 | * | 2/2003 | Nagashima et al. ........ 361/687 |
| 6,563,705 B1 | * | 5/2003 | Kuo |
| 2003/0063433 A1 | * | 4/2003 | Huang |

OTHER PUBLICATIONS

UNKNOWN, "Air Baffle with Integral Hinge Pin and Latches," Research Disclosure, Kenneth Mason Publications Ltd (England), No. 344, (Dec. 1992).

Rutledge et al;, "Method and Apparatus for Reusing a Flat Panel Monitor," Application Ser No. 09/966,061; IBM Docket RPS920010153US1.

* cited by examiner

ALL-IN-ONE PERSONAL COMPUTER WITH TOOL-LESS QUICK-RELEASE FEATURES FOR VARIOUS ELEMENTS THEREOF INCLUDING A REUSABLE THIN FILM TRANSISTOR MONITOR

RELATED APPLICATION

This application claims priority from Provisional Application Ser. No. 60/325,567 filed Sep. 28, 2001.

BACKGROUND OF THE INVENTION

The present invention relates to an improved personal computer, and in particular to a self-contained, all-in-one personal computer with multiple tool-less, quick-release features, and a reusable thin film transistor monitor.

Personal computer systems are, by now, well known in the art and have been supplied in a number of different configurations, including desktop systems with CPU housings separate from monitors, notebook systems, and unitary systems. In unitary systems, as the term is here used, information handling elements of the system such as the central processor, associated memory, drives and options such as modems or network interface cards are housed in a common housing with the display or monitor. This form of system organization differs from other forms which might dispose the information handling elements in a common housing with an input device such as a keyboard.

In all such personal computer system organizations, it has been conventional to assemble the information handling elements within a housing using conventional fasteners such as screws and bolts to assemble the housing and mount the information handling elements. While such assemblies have served well, its is desirable for purposes of upgrading or improving systems from time to time that elements of the system be accessible without need for tools such as screwdrivers and wrenches.

SUMMARY OF THE INVENTION

The present invention has as a purpose the provision of a unitary personal computer system, as the term is used herein, specifically designed and implemented to facilitate maintenance and upgrading. With this purpose in mind, provision is made for access to the information handling elements of the system by release of manually actuable latches and the like.

It is also a purpose of this invention to mounted the information handling elements in ways which facilitate orderly and attractive use, such as by providing smooth transitions between stowed and active positions and ready adjustment of positions.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
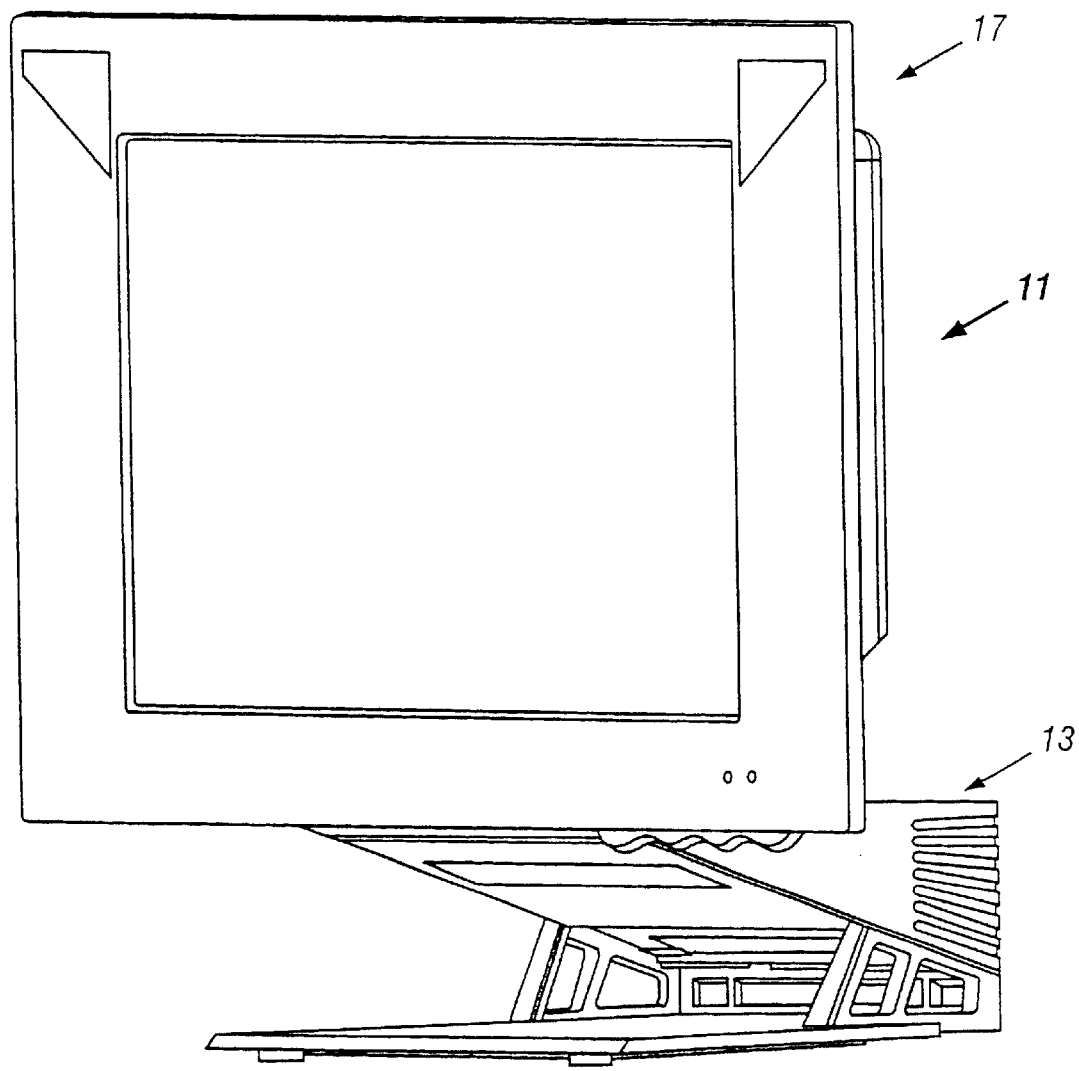
FIG. 1 is a front isometric view of one embodiment of an all-in-one computer constructed in accordance with the present invention.
Figure 2:
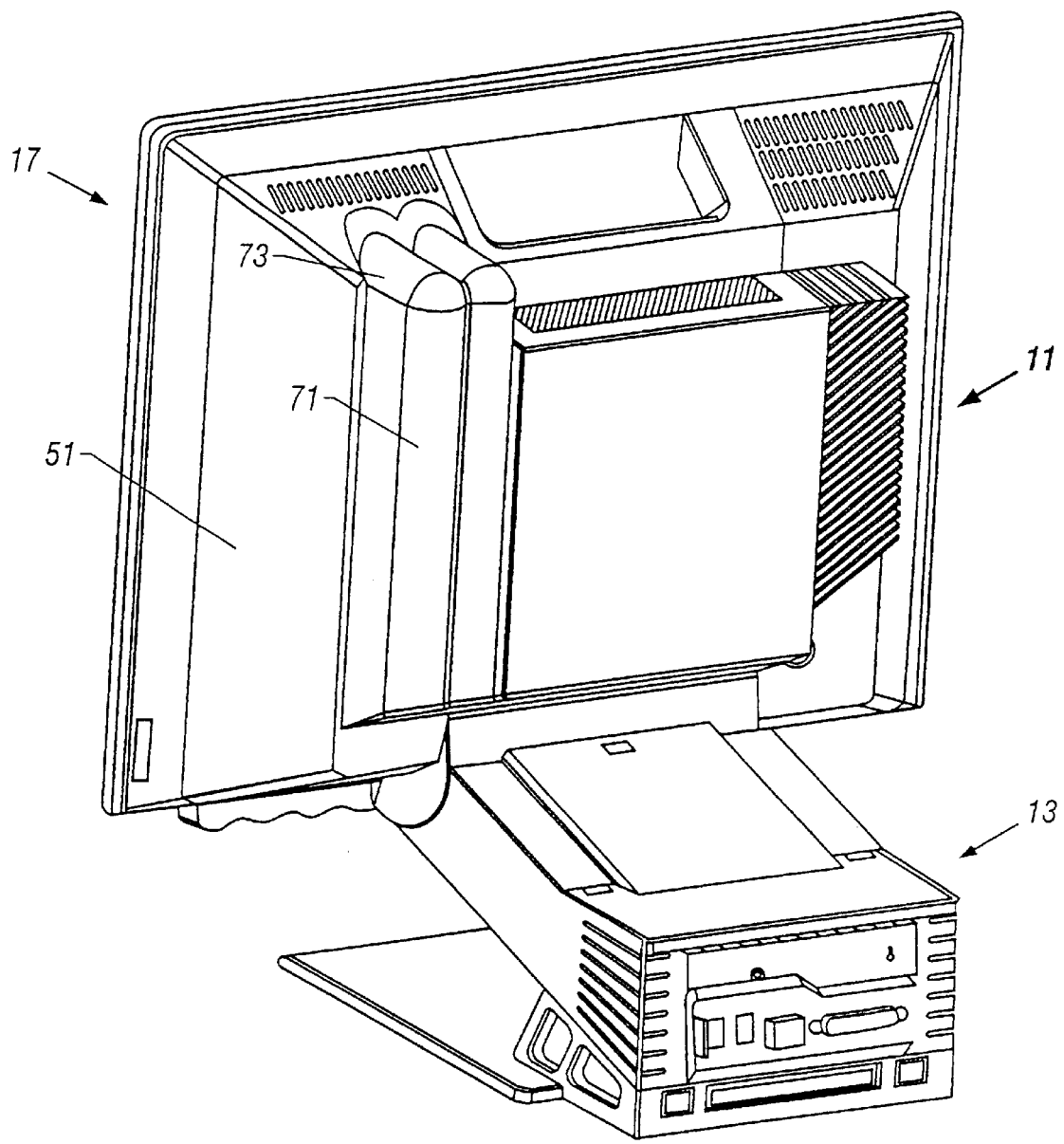
FIG. 2 is a rear isometric view of the computer.
Figure 3:
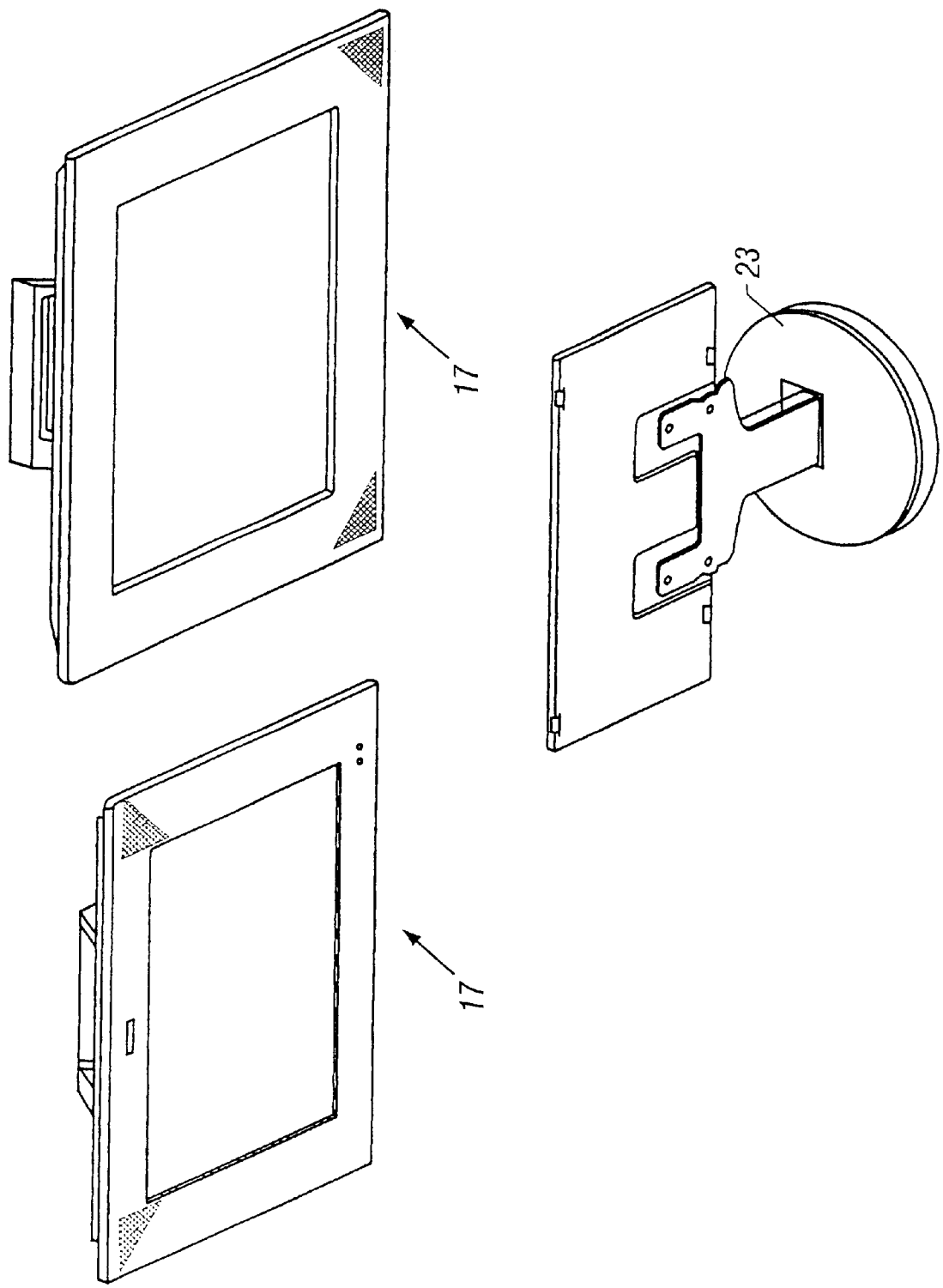
FIG. 3 is an isometric view of optional TFT monitors for the computer and a stand-alone mount for the monitors.
Figure 4:
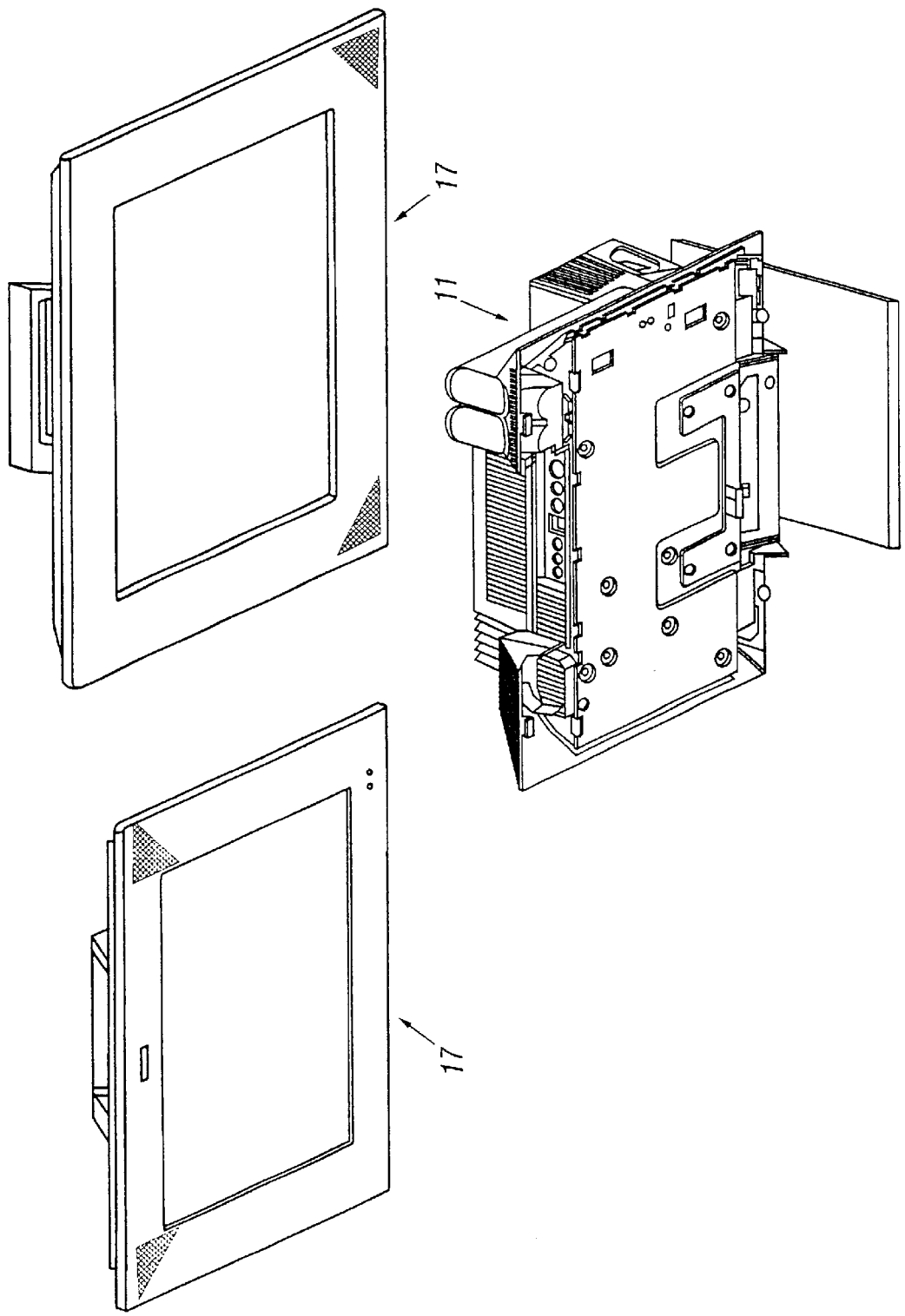
FIG. 4 is an isometric view of the optional TFT monitors with respect to the computer.

Referring to FIGS. 1, 2, 21, and 22, a personal computer (PC) 11 mates a central processing unit (CPU) 13, motherboard (MB) 15, thin film transistor (TFT) video monitor 17, and direct access and storage devices (DASDs) 19 together in an "all-in-one" package. This design has one objective of allowing monitor 17 to be reused after the utility of CPU 13 has been reduced or become obsolete and a more powerful unit is desired. This invention achieves an advantage by allowing easy tool-less separation of monitor 17 from motherboard chassis 21. This separation allows for the ease of upgrading PC 11 from one with a 15-inch TFT monitor to one with a 17-inch TFT monitor, or other sizes. The TFTs can be of differing sizes (FIG. 4) and can be reusable on the next generation PC, or on a stand kit 23 (FIG. 3). The stand kit has the same type of mechanical features as PC 11.

Figure 5:
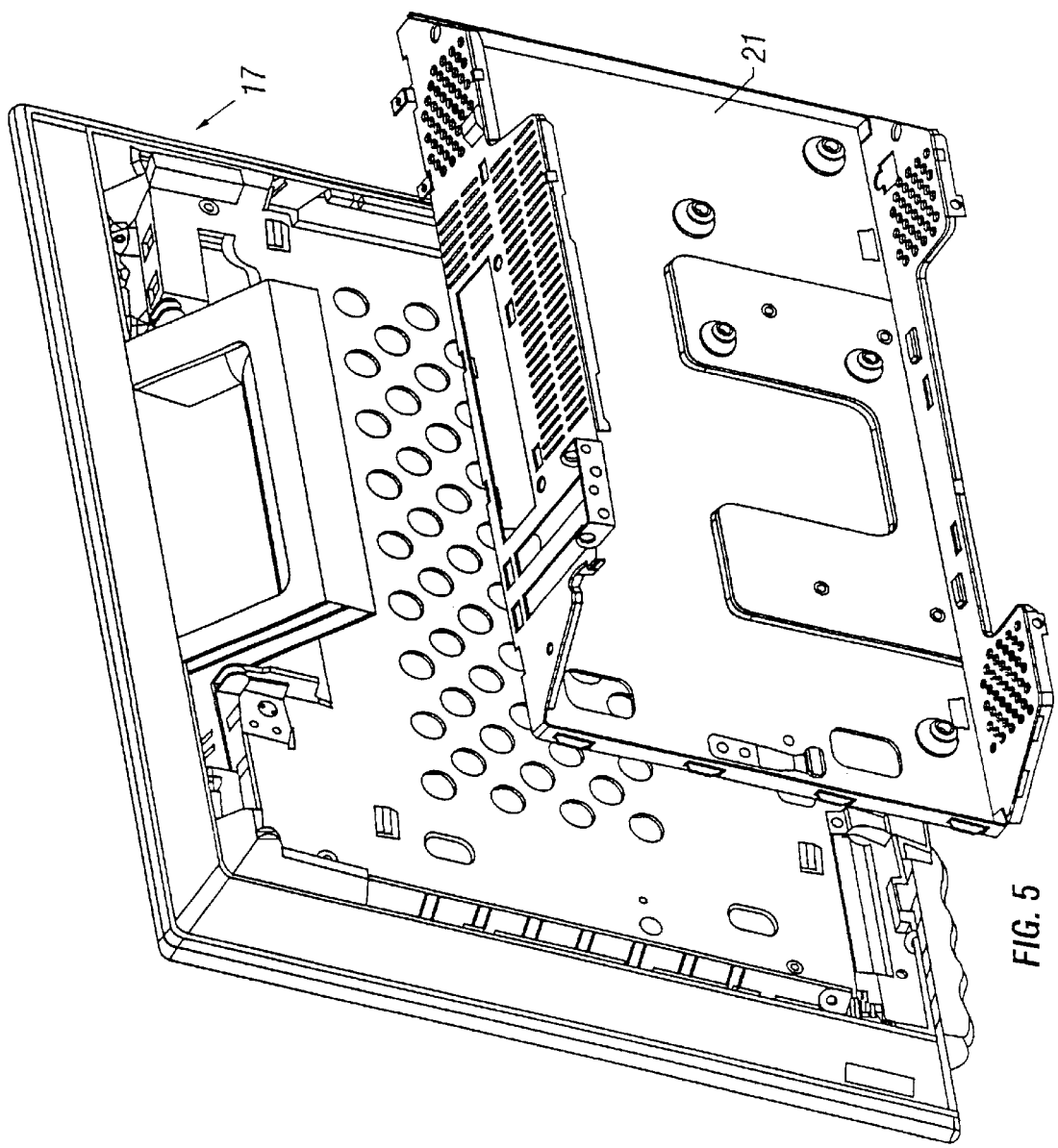
FIG. 5 is a rear isometric exploded view of the monitor and a portion of the computer chassis.
Figure 6:
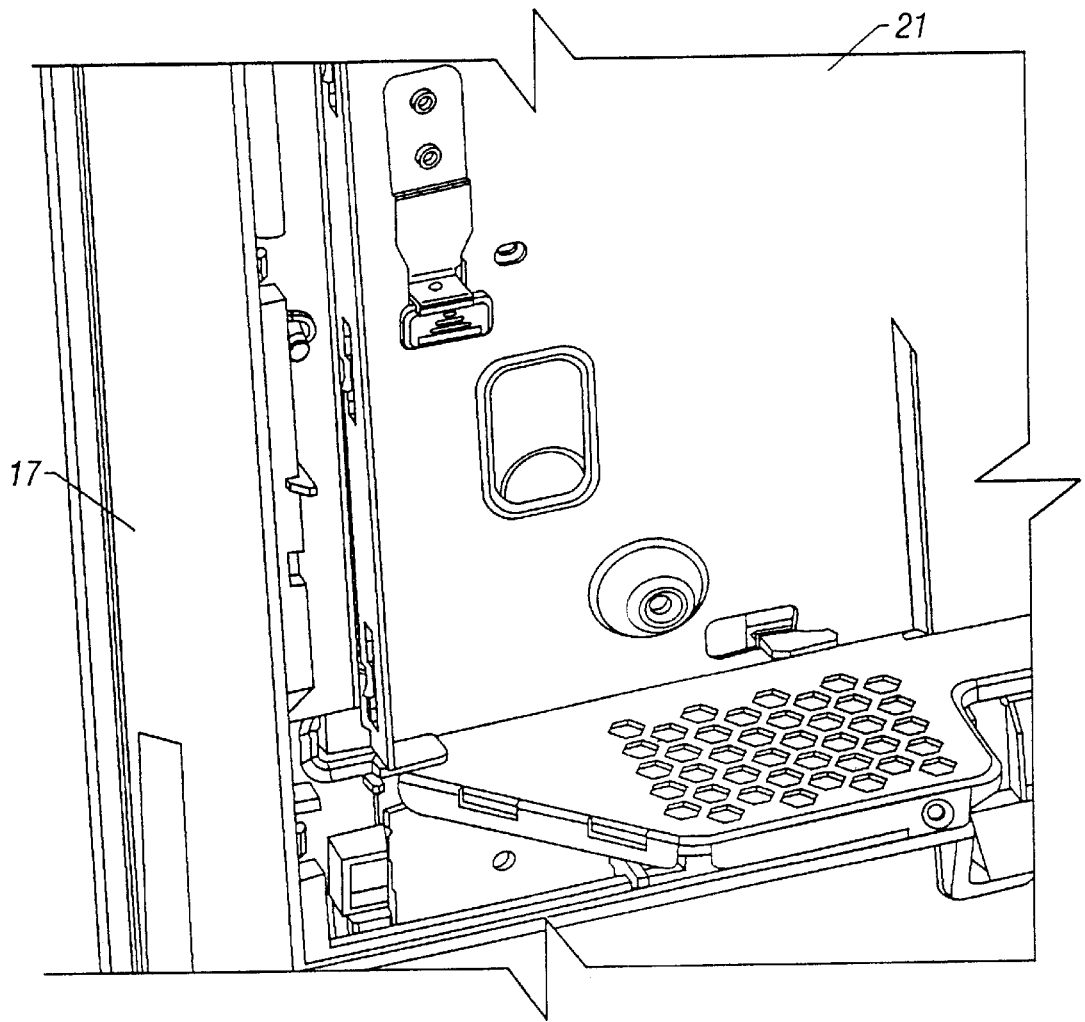
FIG. 6 is a partial isometric view of the monitor and chassis exposed.

PC 11 has a number of unique attributes and is differentiated from prior art designs for a variety of reasons. These features include a tool-less integration of the TFT with the chassis. For example, as shown in FIGS. 5 and 6, TFT monitor 17 can be hooked, slid into place, snapped onto and removed from chassis 21 without the use of any tools. Other attributes include: a rear TFT swing-away tool-less chassis bucket, a quick-release and attach all-in-one PC cable trough, a tilt-away personal computer interface (PCI) card retainer clip, a flip-out tool-less hard disk drive (HDD) bracket, an embossed torsional base stability plate, a solenoid-controlled drop-down CD-ROM, an articulated minimalist arm attach mechanism, and offset gear teeth to reduce non-linear motion. Each of these features will be described in further detail in the following detailed description.

Figure 7:
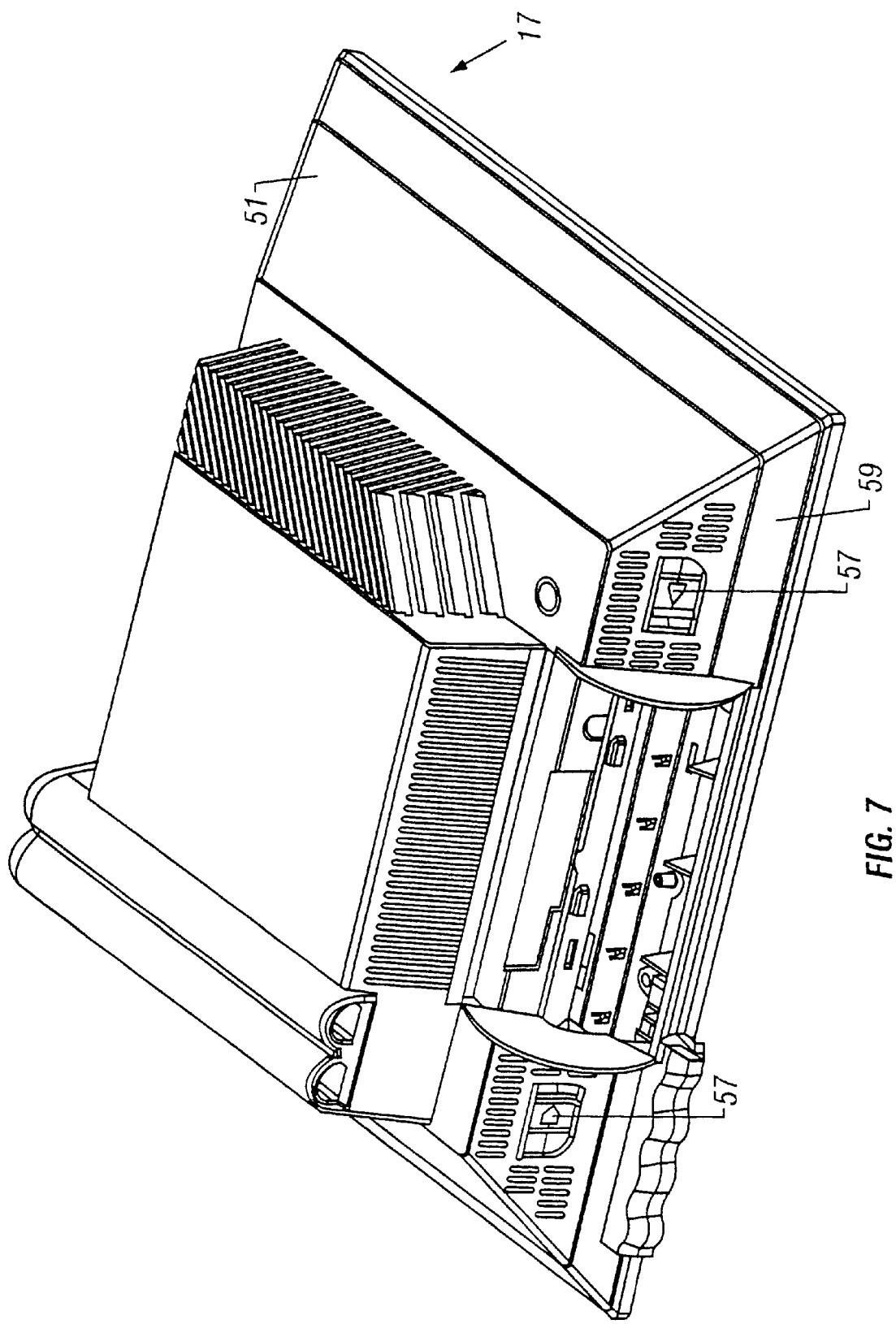
FIG. 7 is a lower isometric view of a rear bucket cover for the monitor.
Figure 9:
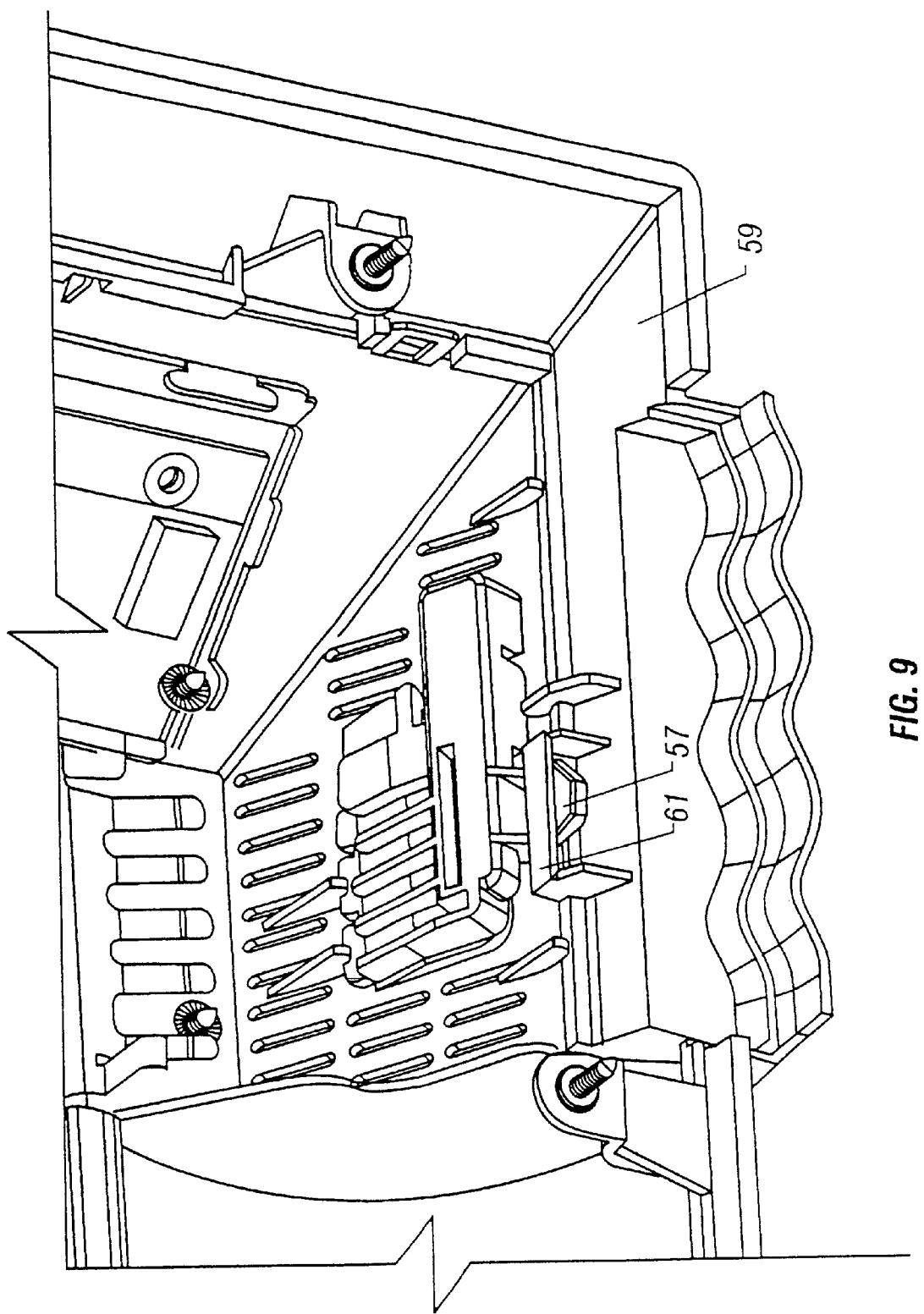
FIG. 9 is an interior isometric view of the bucket showing a latch and receptacle arrangement.
Figure 10:
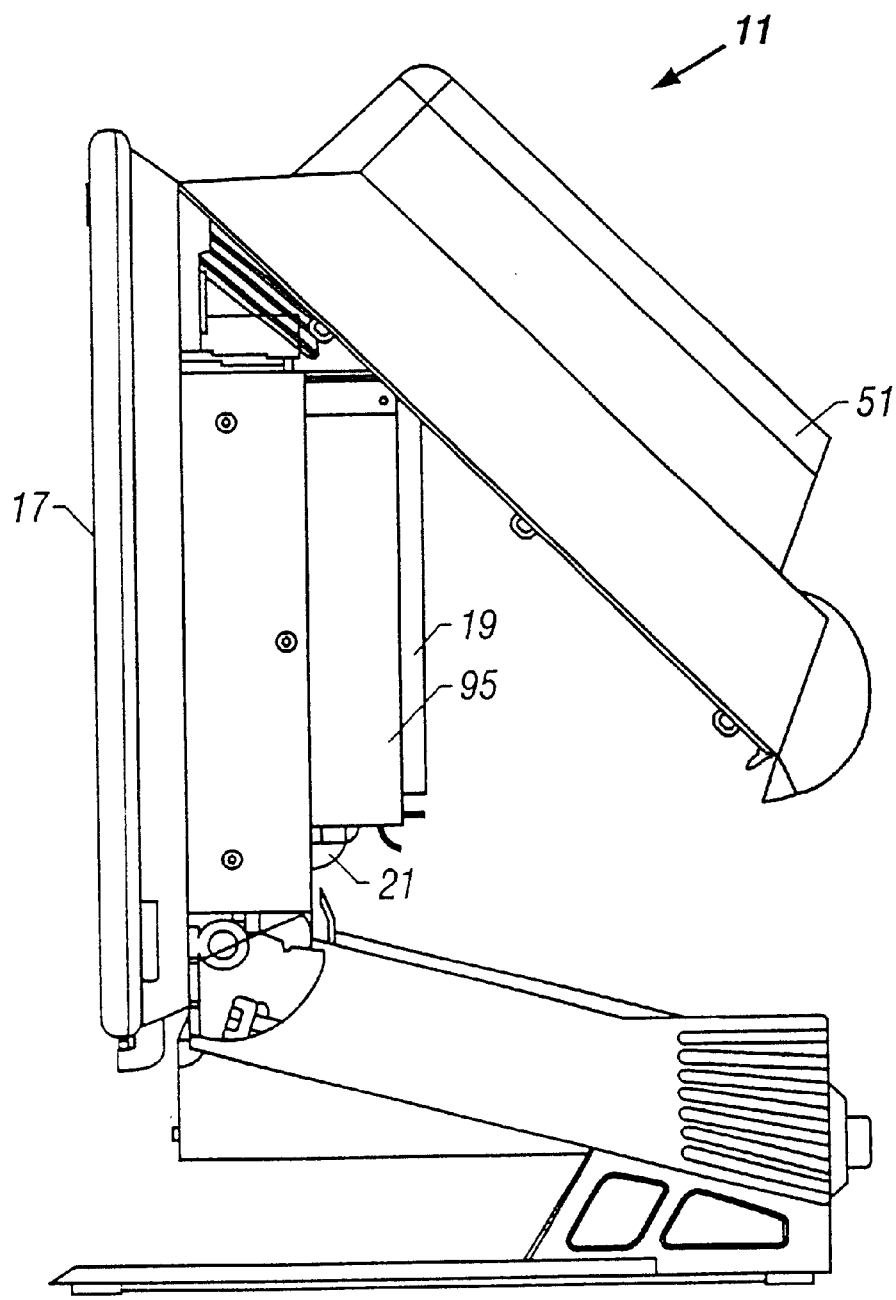
FIG. 10 is a side view of the computer with the bucket partially open.
Figure 11:
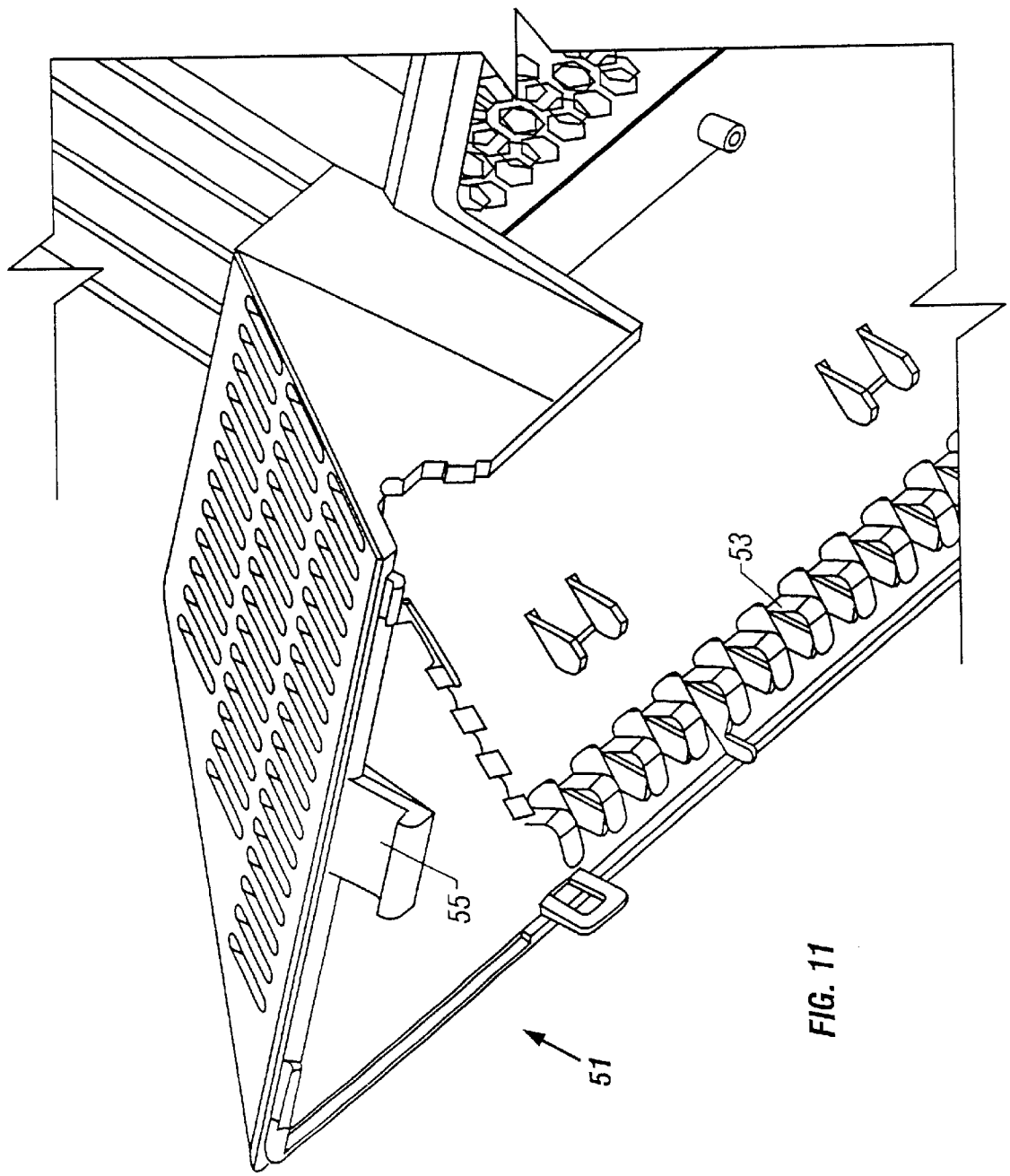
FIG. 11 is an enlarged isometric view of one of the hooks on the bucket.

Referring now to FIGS. 7–13, PC 11 is provided with a tool-less swing-away chassis bucket 51 for the TFT all-in-one computer with electromagnetic interference (EMI) shielding 53 (FIG. 11), and an optional TFT stand-alone mount 23 (FIG. 3). It is uniquely held and snapped in place by means of strategically placed snaps 57 and hooks 55, as shown in FIGS. 7 and 11, respectively. In the prior art, the rear buckets are restrained by fasteners (e.g., screws) that require tools and which are not readily accessible. While this prior art design is desirable in some sealed box applications in a PC, some users prefer ready access to add memory, change out a hard file, etc. The present invention allows the user to access PC 11 to add and change features without the hassle of tools to remove fasteners. This approach also allows for easier manufacturing because of the lack of fasteners and tools needed, thereby making assembly quick and easy.

Another attribute of the design of bucket 51 is the inclusion of a key lock (not shown) for those users who desire greater security to keep out unwanted intrusions into PC 11. One of the problems overcome by this unique approach in the integral EMI shielding 53 (FIG. 11) built into the inside of bucket 51. Shielding 53 is designed to swing away from chassis 21 with bucket 51 as a single integrated unit, yet provide an EM seal when bucket 51 is closed with respect to PC 11.

Figure 8:
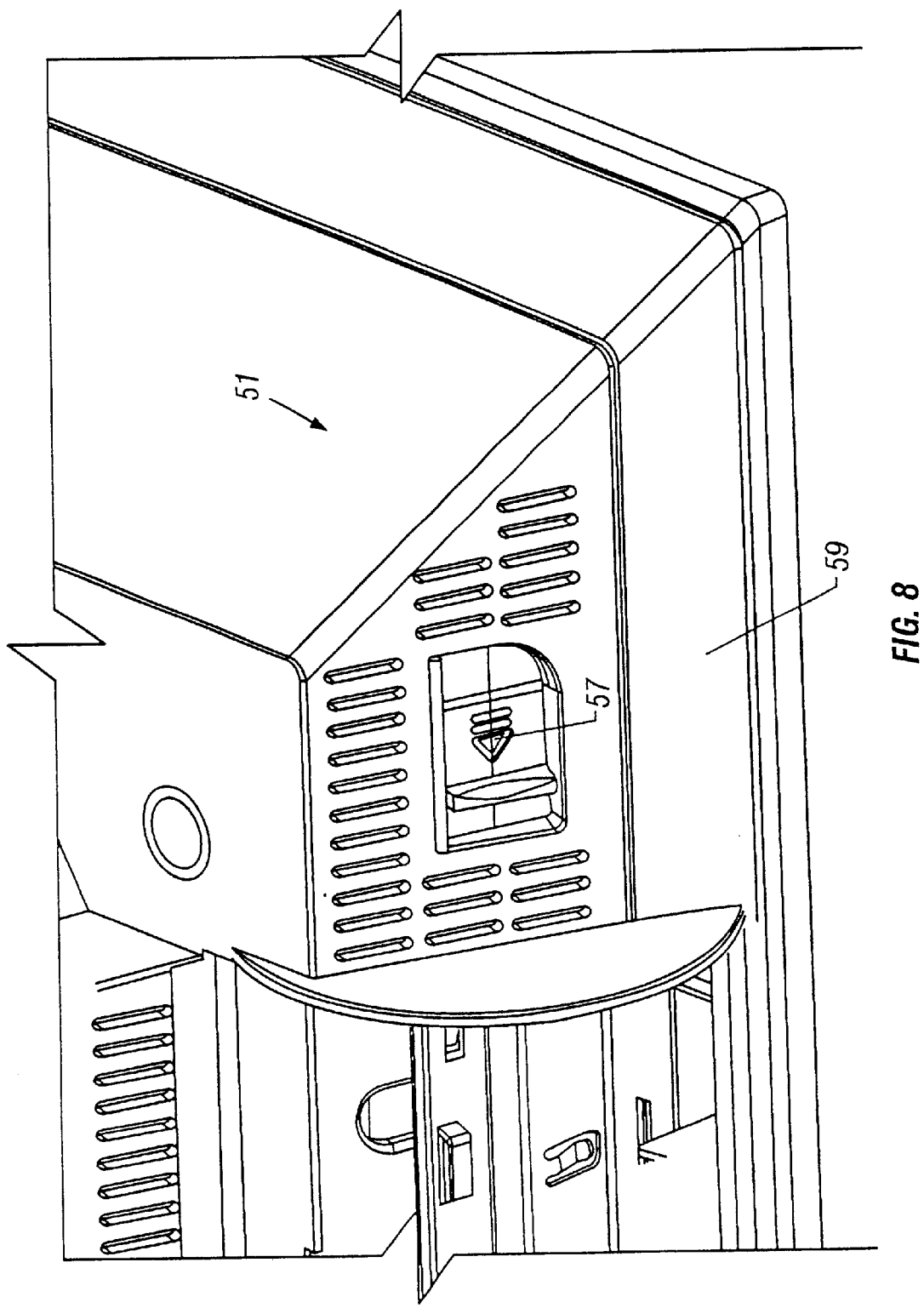
FIG. 8 is an enlarged isometric view of a latch on the bucket.

This feature achieves these advantages by hooking and snapping into the back skirt 59 of monitor 17 (see FIG. 9). Bucket 51 is a one-piece design that hooks into the top of skirt 59 on monitor 17 and swings down into the closed position. In the closed position, snap features 57 with movable portions that slide into place in receptacles 61 at the bottom skirt of monitor 17. FIG. 7 shows a rear bottom view of the bucket in place on top of monitor 17. The snap-in-place latches 57 can be seen on both sides of the bottom opening. Latches 57 are designed for finger pressure release and slide toward each other as the monitor releases from receptacles 61. FIG. 8 shows the exterior of one latch 57. The inner portion of latch 57, with the latch 57 inside receptacle 61, can be seen in FIG. 9.

Latches 57 are spring-loaded away from each other and, once latched, are released by moving them individually toward each other. When bucket 51 is closed, a ramp on the tip of latch 57 that goes into receptacle 61 is moved out of the way and latch 57 enters receptacle 61 in a snapping motion with an audible click. Therefore, latch 57 is automatically engaged upon closing bucket 51 against monitor 17 and is locked in that position until released by sliding latch 57 to the open position. FIG. 10 shows bucket 51 in a partially open, wherefrom the bucket can fall to the closed position or be opened to the full position and removed. Bucket 51 is engaged with skirt 59 at the top of monitor 17 through the operation of symmetrical hooks 55 on bucket 51 and receptacles 67 (FIG. 13) on skirt 59. One of the receptacles 67 can be seen in FIG. 12.

As shown in FIGS. 2 and 14–19, the quick-release and attach all-in-one PC cable trough 71 is a cable management system that solves the problem of introducing a cable trough to the back of PC 11 while allowing flexibility in manufacturing assembly, cable management, and usability. This design is a cable management solution that addresses the problem of routing cables, particularly the input/output cables, from the top back of the vertically standing monitor 17 away from the machine.

Figure 14:
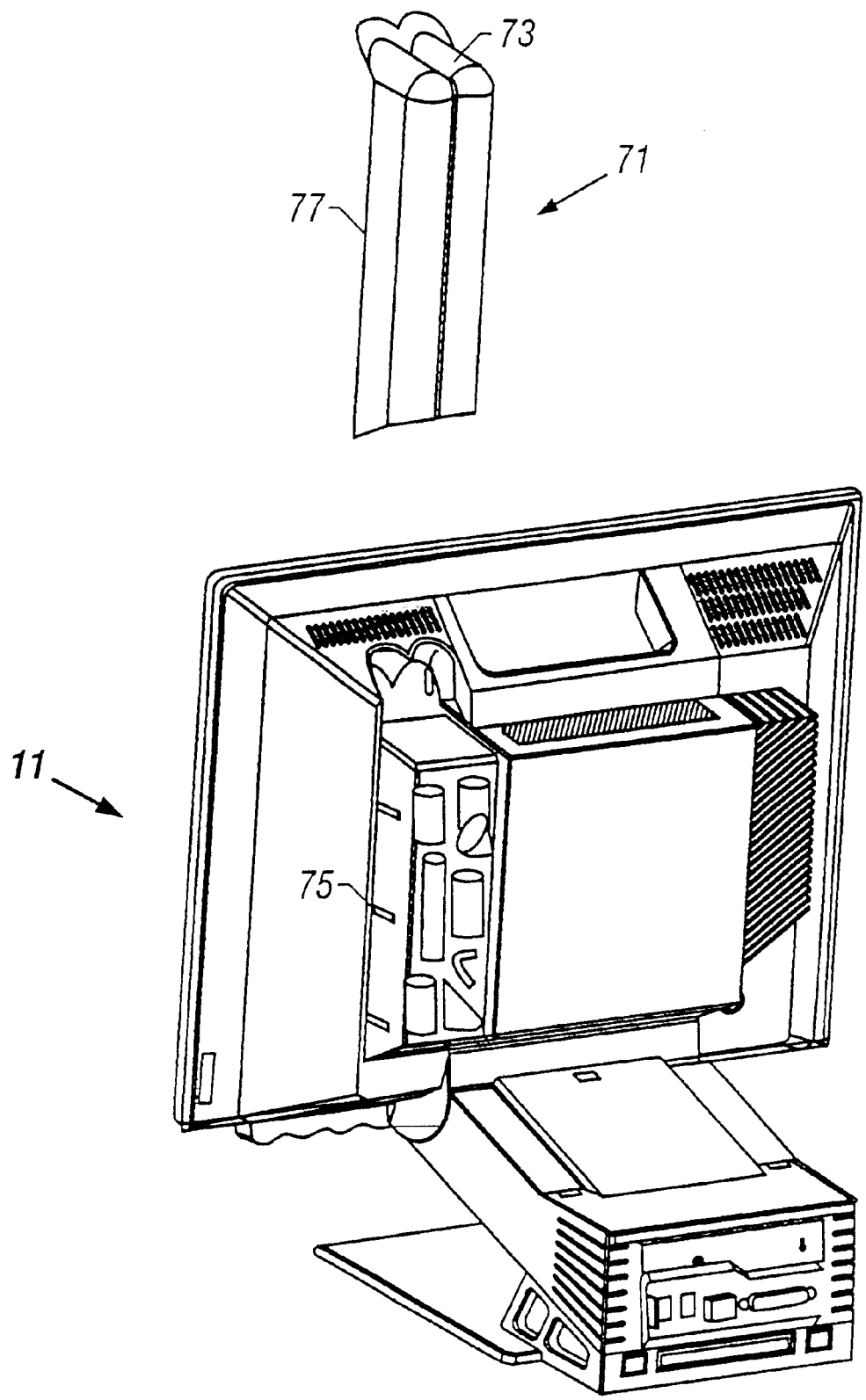
FIG. 14 is a rear isometric view of a cable management system exploded away from the computer.
Figure 15:
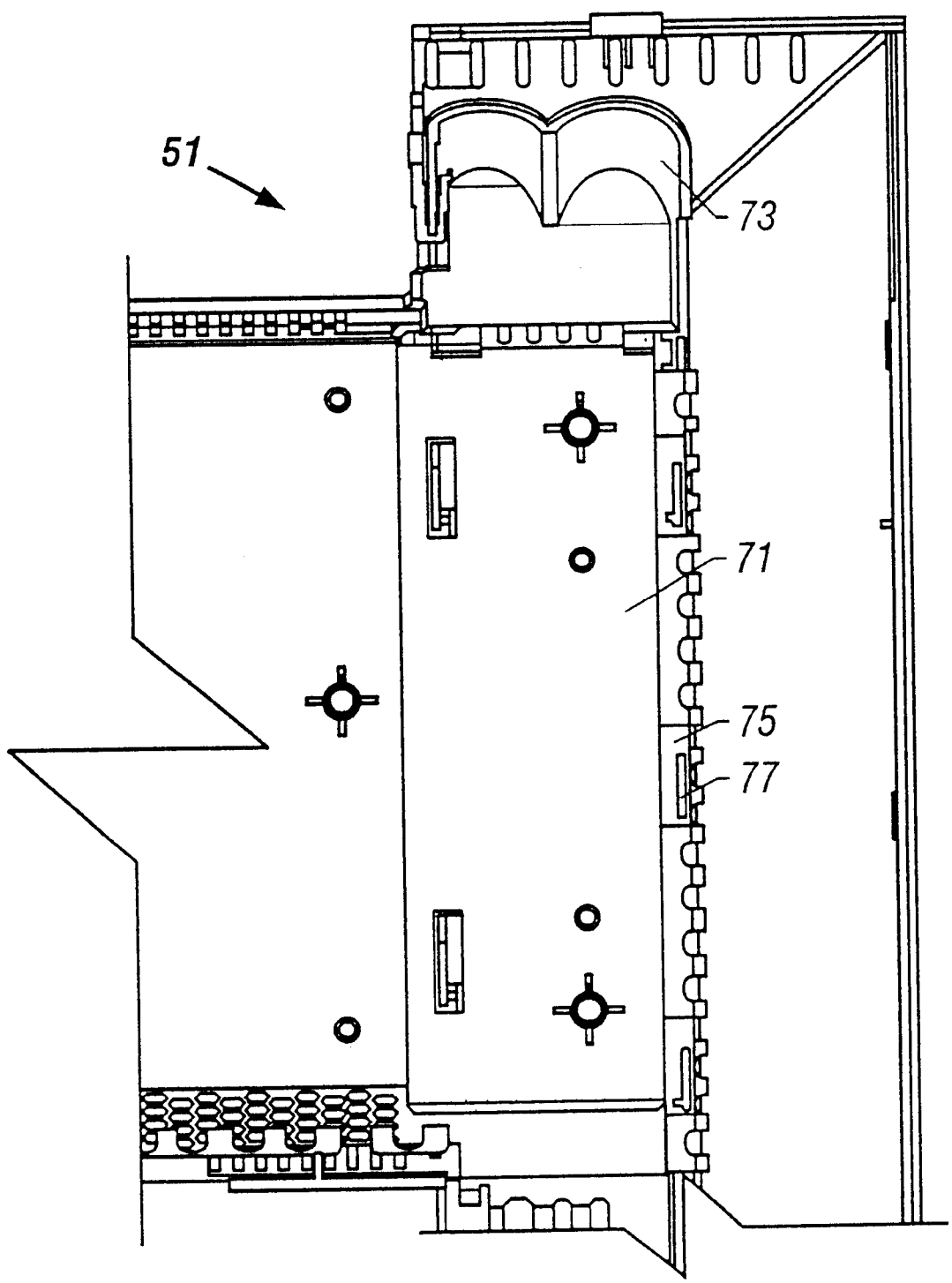
FIG. 15 is an interior front view of the bucket and cable management system.
Figure 16:
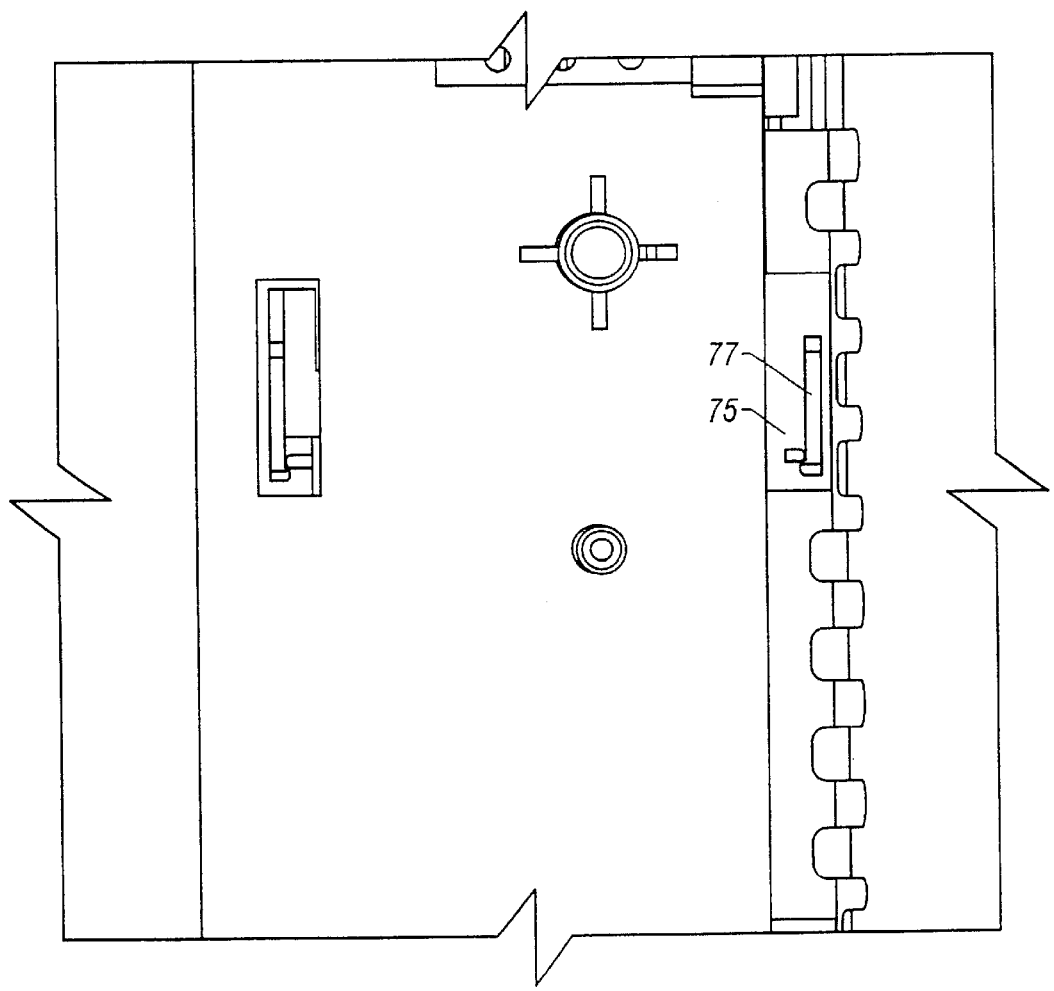
FIG. 16 is an enlarged interior front view of the bucket and cable management system.

The cable management system comprises a bi-tubular cable trough 71 with a removable top 73. Trough 71 and top 73 are held together as an integral unit and are fitted to the back of bucket 51 through a series of slots 75 in bucket 51 and a corresponding series of snap hooks 77 on trough 71. FIG. 14 shows the system above PC 11 as if removed or before installation. The snapped hooks 77 can be seen engaged in slots 75 in FIGS. 15 and 16. Cables from the top planar I/O area are routed through a slot under the handle 79 of this embodiment and passed over the top of the PCI card opening. At this point, trough 71 is slid down into place as an integrated unit with top 73 and cover up the cables to hide them from view along the back of PC 11 (FIG. 2).

Figure 17:
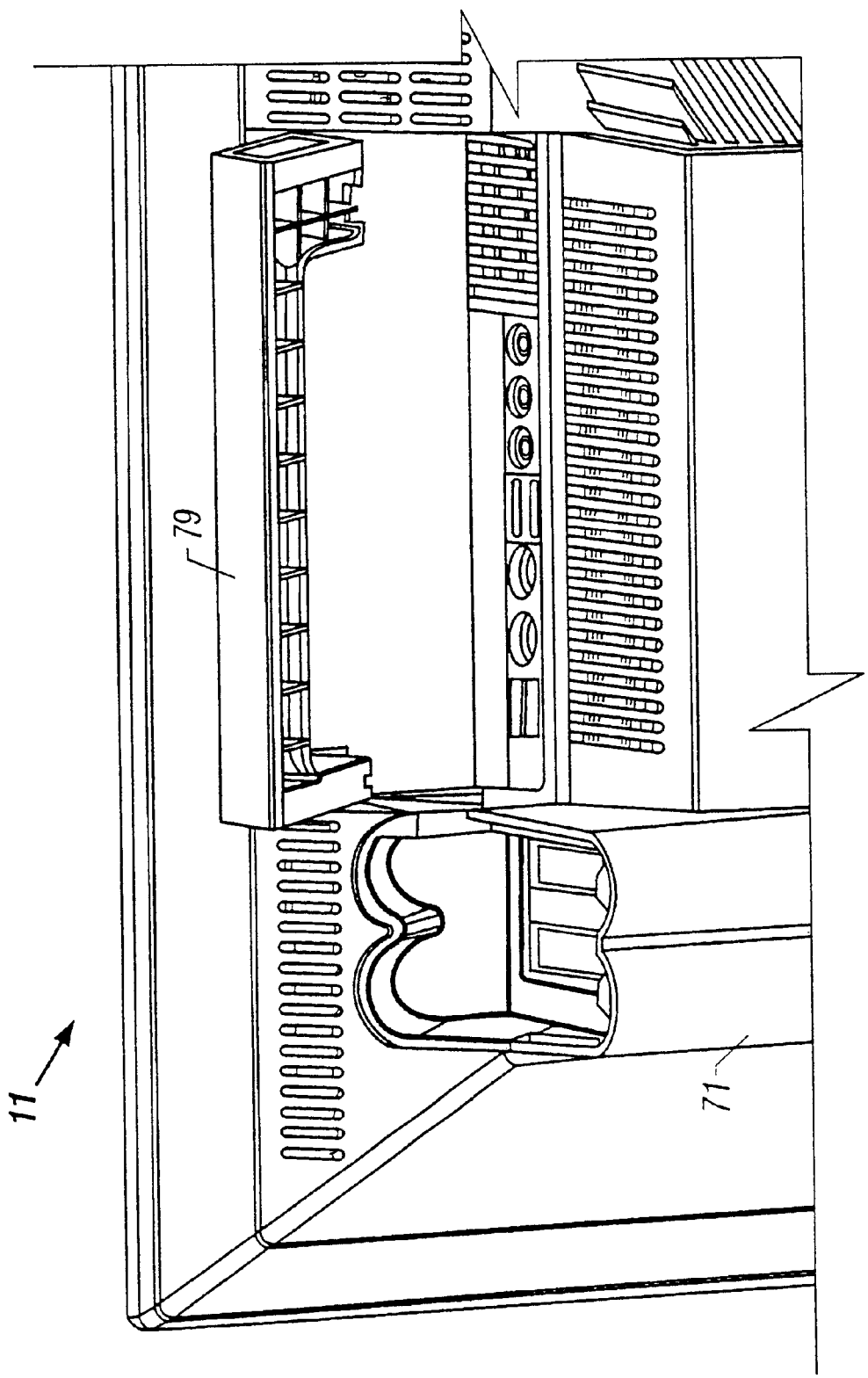
FIG. 17 is an enlarged top rear isometric view of a portion of the cable management system engaged with the computer.
Figure 18:
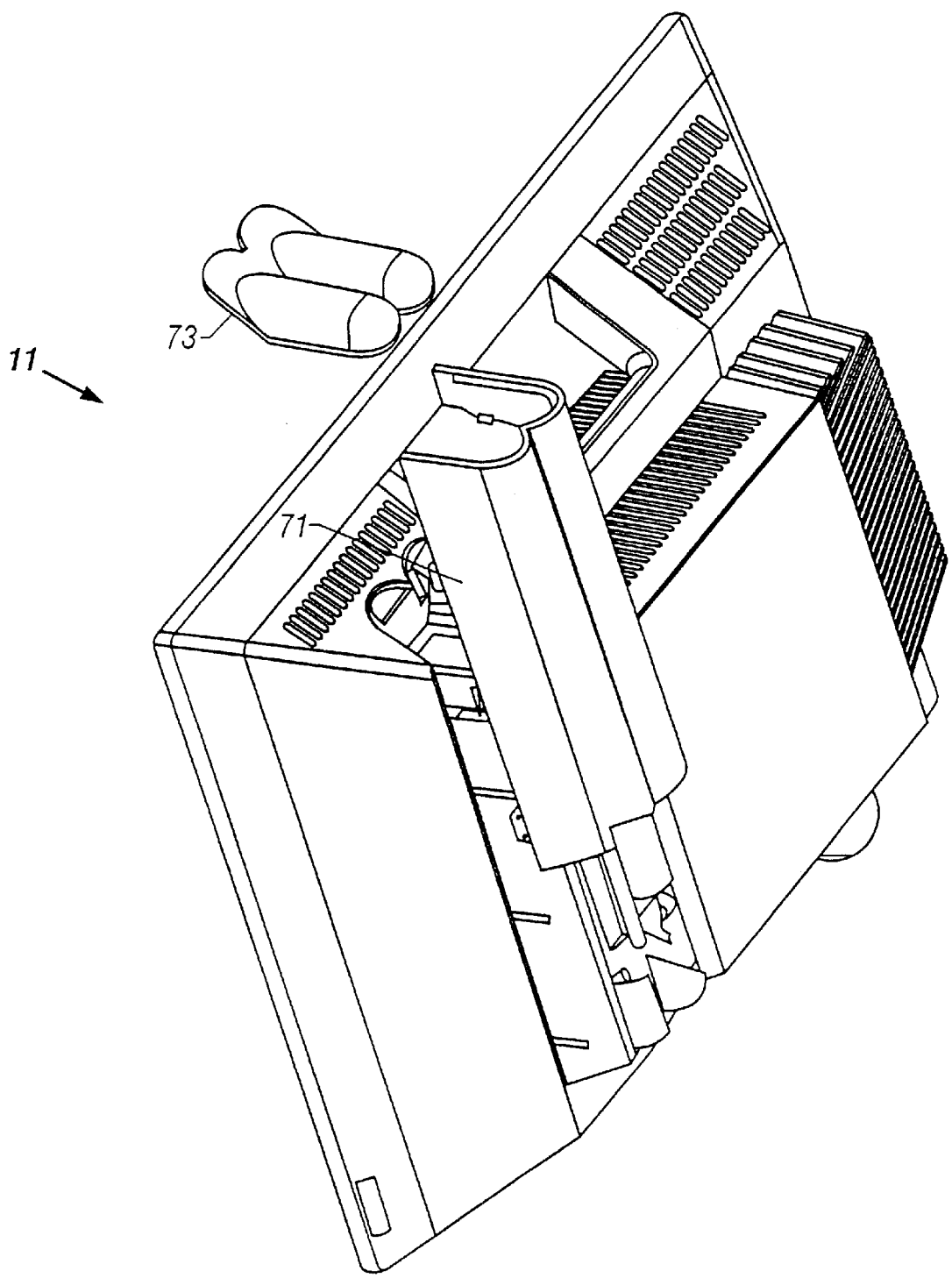
FIG. 18 is a top rear isometric view of the cable management system exploded away from the computer.
Figure 19:
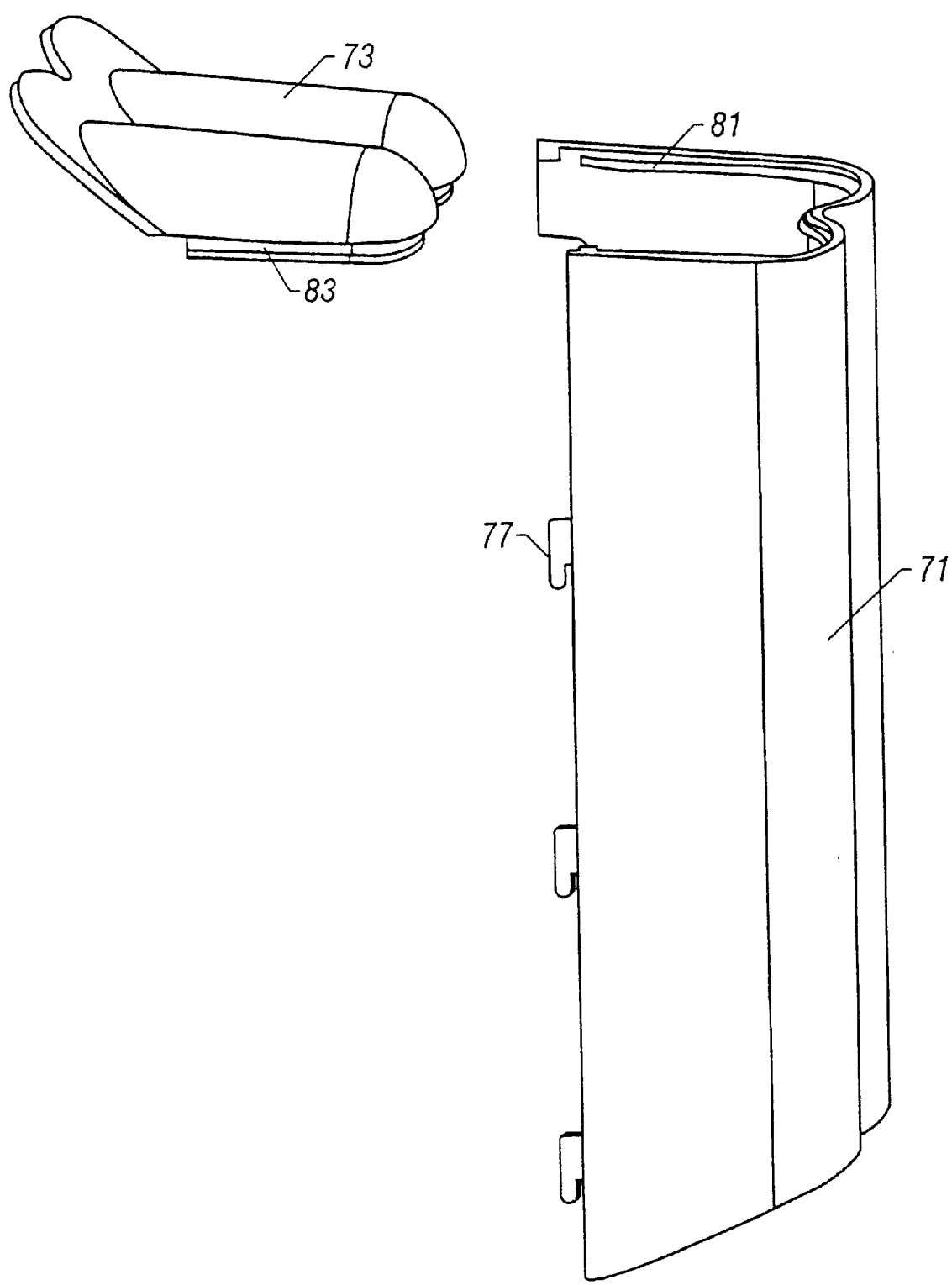
FIG. 19 is an exploded isometric view of the cable management system.

There are situations in which cables are plugged into the I/O PCI cards at the top of trough 71. In these cases, the cables would interfere with top 73. The present design addresses this situation by having trough 71 separate into two pieces, as shown in FIGS. 17–19. Trough 71 and top 73 are separated into two pieces by a unique track and snap arrangement between the pieces. As shown in FIG. 19, trough 71 has a protruding rib 81 around its inner periphery along with a set of disconnected stops that act to prevent the accidental reversal of assembly. Top 73 has a track 83 around its inside periphery that engages rib 81. When fully engaged, the sides of trough 71 spring back into position, bringing the stops into play to prevent accidental disassembly while handling trough 71 and top 73 as one piece. Top 73 is disassembled by pulling out the sides of trough 71 and sliding the track 83 on top 73 past the stops and then all the way out of rib 81.

Figure 12:
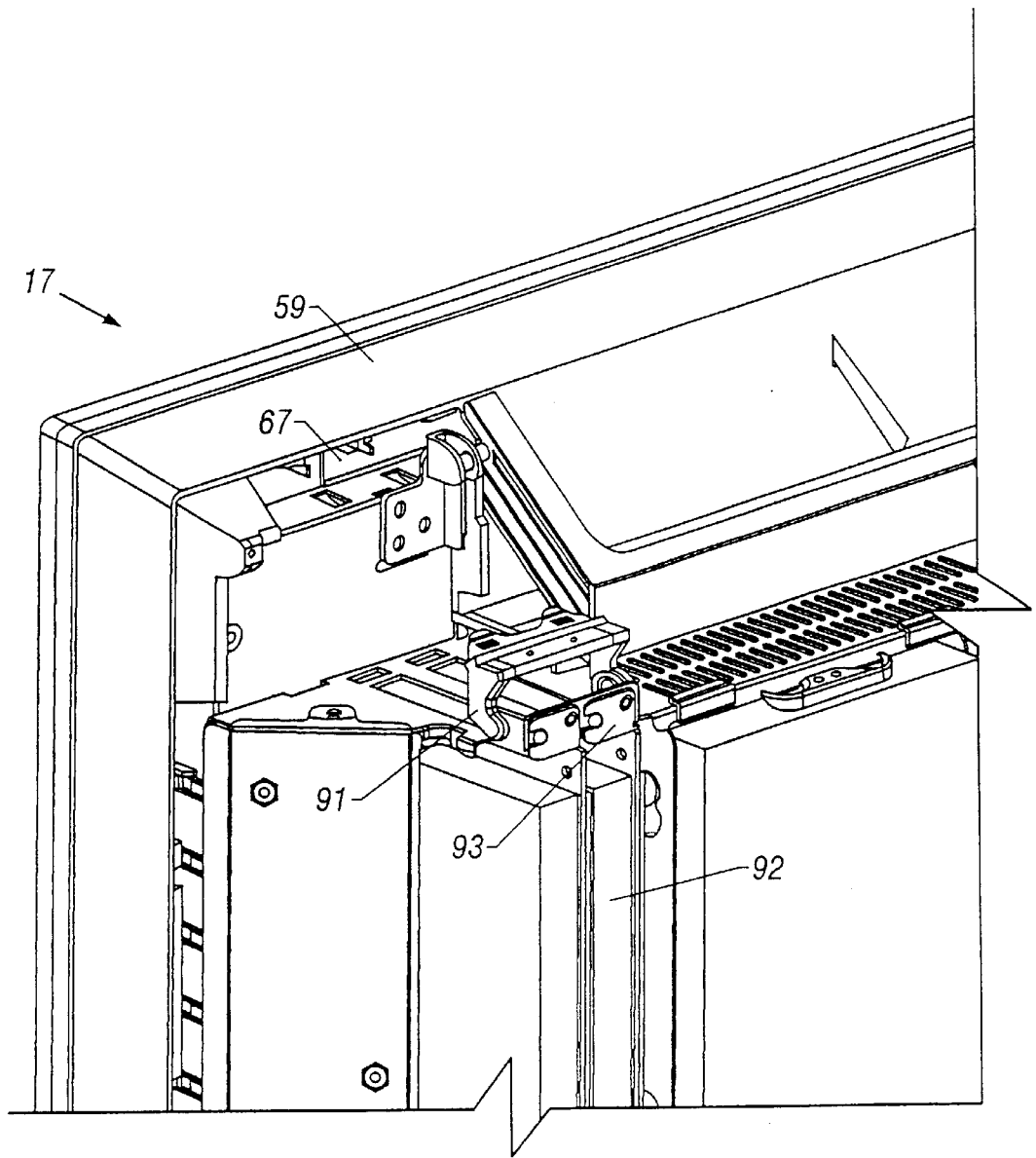
FIG. 12 is an enlarged rear isometric view of the open computer with a clip in a disengaged position.
Figure 13:
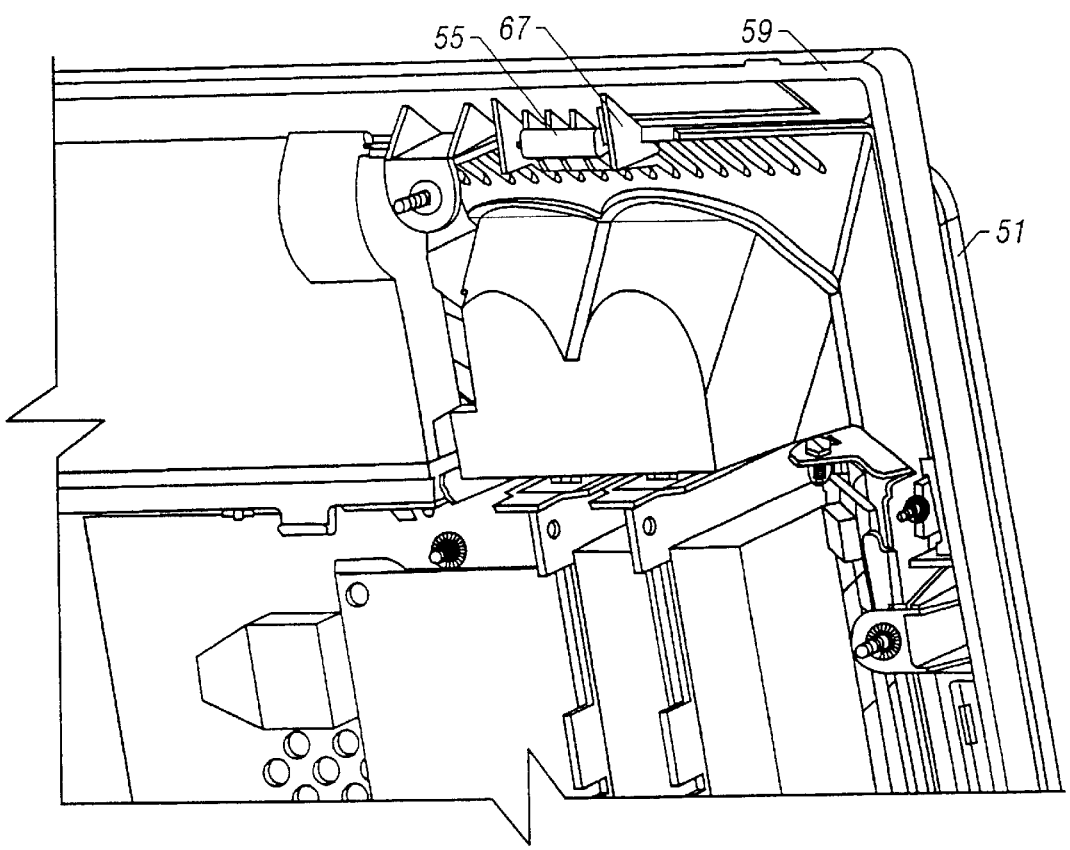
FIG. 13 is an enlarged isometric view of the hook and receptacle engaged.
Figure 20:
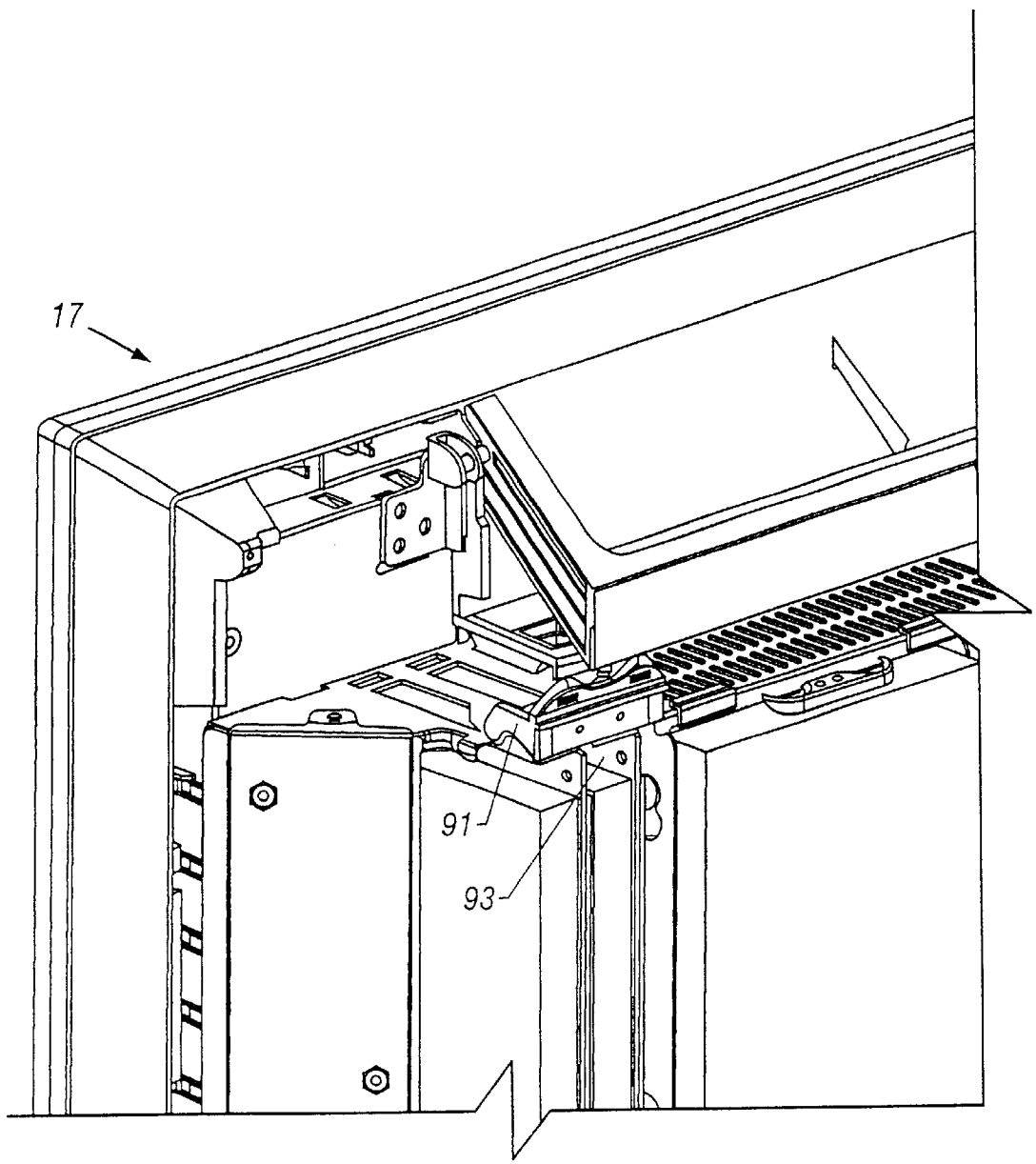
FIG. 20 is an enlarged rear isometric view of the computer with a clip in an engaged position.

Referring now to FIGS. 12 and 20, a tilt-away PCI card retainer clip 91 is shown. PCI cards 92 are kept in place by clip 91 which swings into position on top of the brackets 93 to hold them in place. Clip 91 not only holds the cards in place, but serves as an integral part of the EMI enclosure. In the prior art, PCI cards are typically mechanically maintained in the PC system. This is normally accomplished with a screw or other fastener in the bracket, but a tool-less implementation is preferable. With all-in-one PC 11, bucket 51 serves as the cover over the processor, memory, and planar board. Bucket 51 has EMI shield 53 within it that must contact the periphery of the chassis all around to form a tight seal. The present invention is a tool-less, swing into (FIG. 20) and out of (FIG. 12) place PCI card retainer clip. Clip 91 is captive in the I/O area of PC 11. The swing away motion solves the problem of removing bracket 93 of the PCI cards from the PCI card area as the cards are installed. Bracket 93 is also retained in the assembly and is not loose (like prior art fasteners). In addition, clip 91 incorporates a grounding component that EMI shield 53 in bucket 51 can contact.

Figure 21:
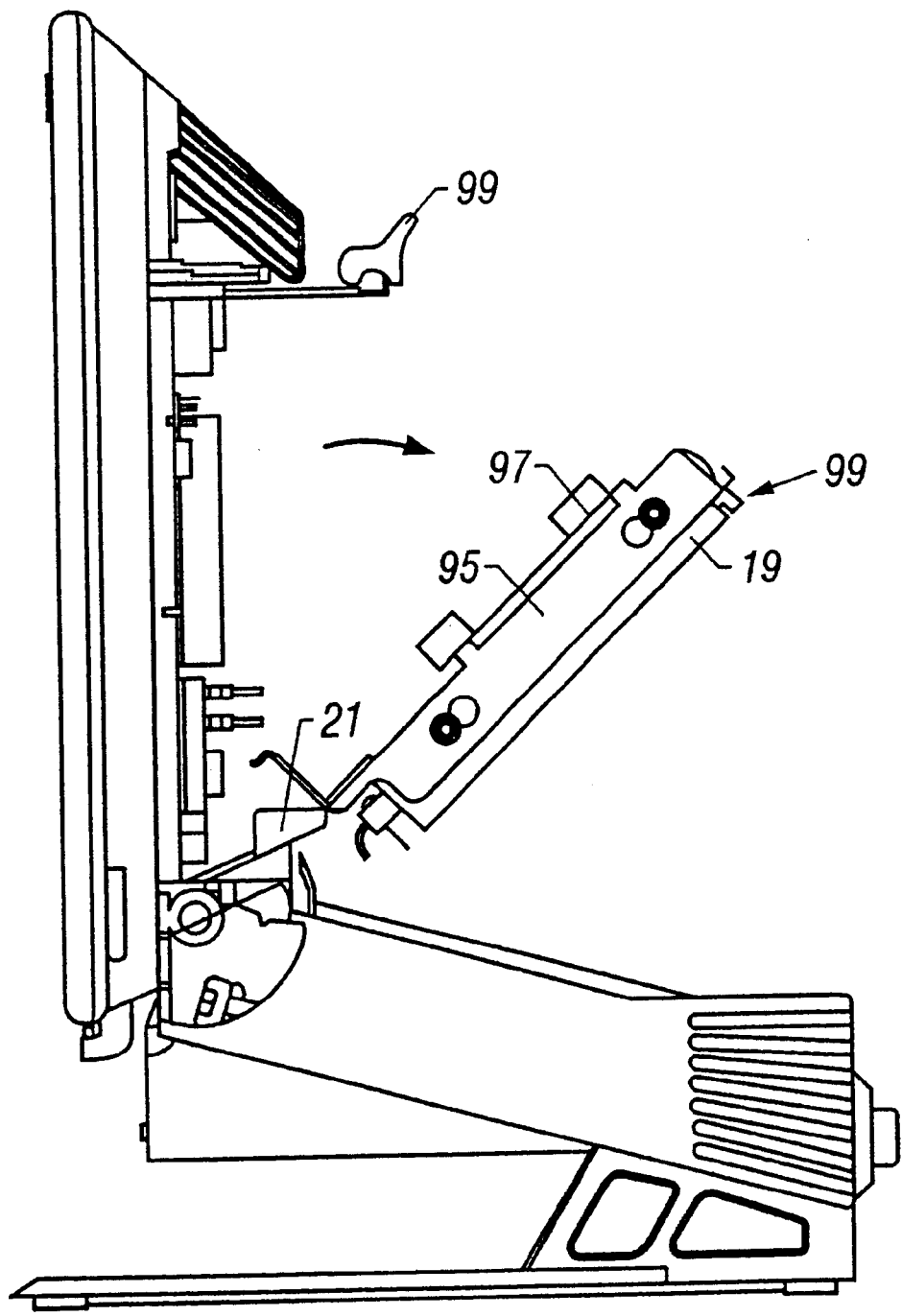
FIG. 21 is a side view of the computer with the bucket removed and a HDD cage in an open position.

As shown in FIG. 21, the HDD 19 is mounted in a cage 95 and may be pivoted out of the way for access to the memory slots and planar top. This is a particularly advantageous feature in the tight package provided by the all-in-one PC 11. Cage 95 and HDD 19 are shown in their upright and latched position in FIG. 10. Like the previous attributes of PC 11, this feature is accomplished without tools and with a minimum number of parts. A bracket 97 also holds the electronic card for the touch screen option. Cage 95 spans the chassis 21 from one side to the opposite side. Cage 95 is hooked into one side of chassis 21 in such a way as to allow it to pivot or flip out of the way when needed.

In the version shown, cage 95 is formed from a single piece of sheet metal. Unique features have been added to chassis 21 and cage 95 to accomplish the swing out ability without extra parts or movement. The opposite end of cage 95 is swung down to chassis 21 and snapped into place via a spring bar 99 with a finger handle on top. The cage is held securely in place in all directions, yet is easily removed by depressing the spring bar at the top.

Figure 22:
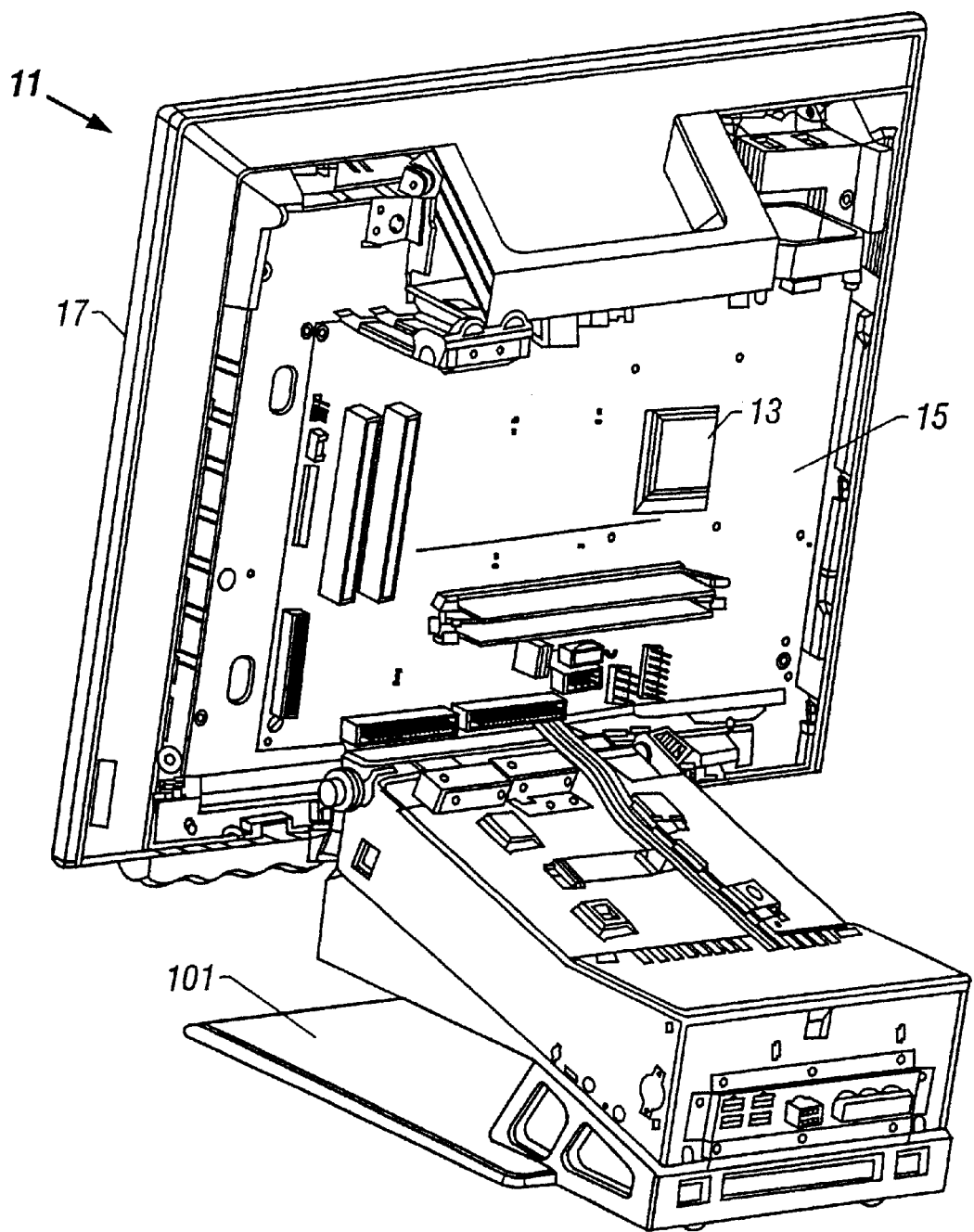
FIG. 22 is a rear isometric view of the computer with its covers removed.
Figure 23:
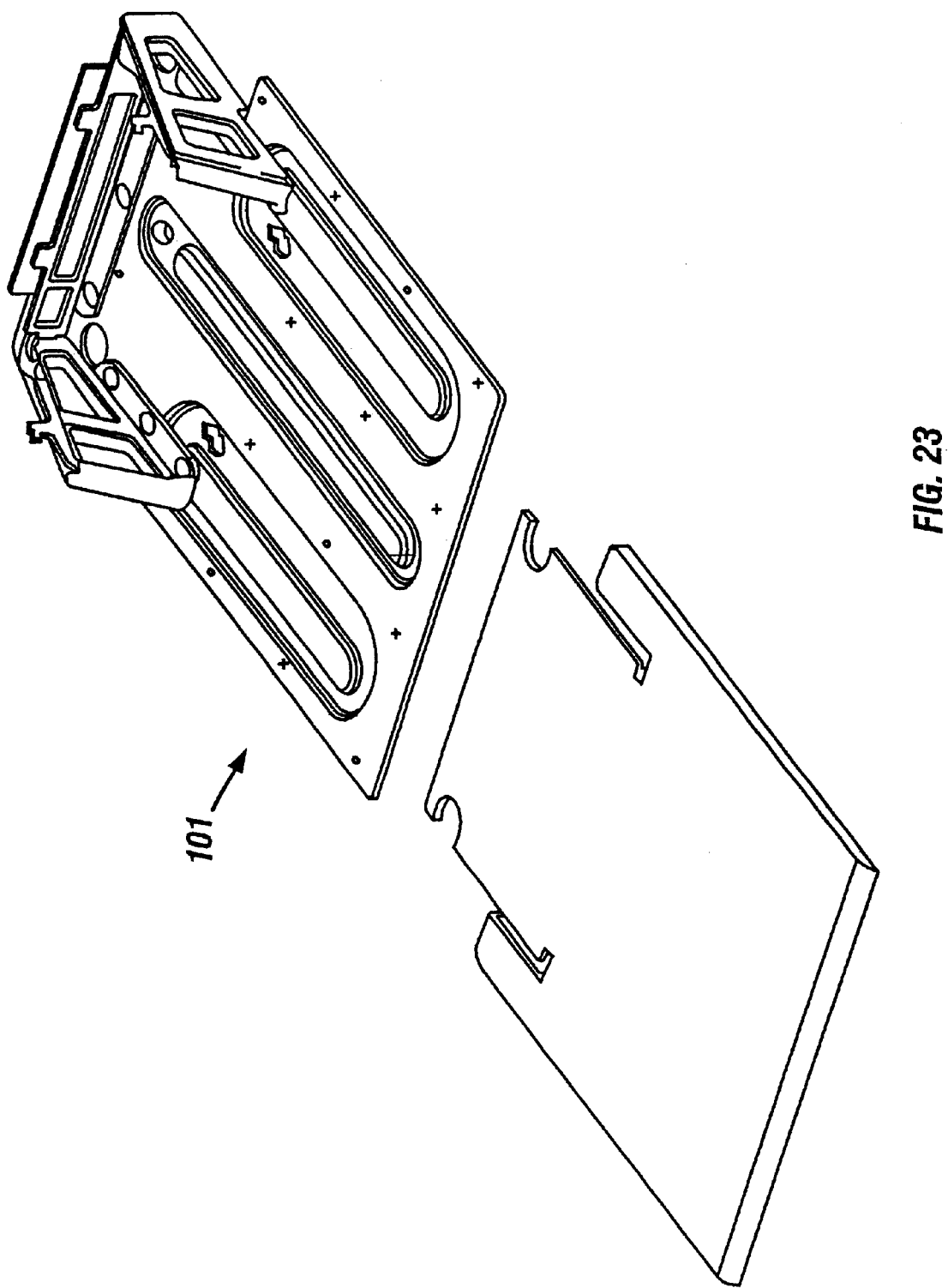
FIG. 23 is an isometric view of a base assembly for the computer.
Figure 24:
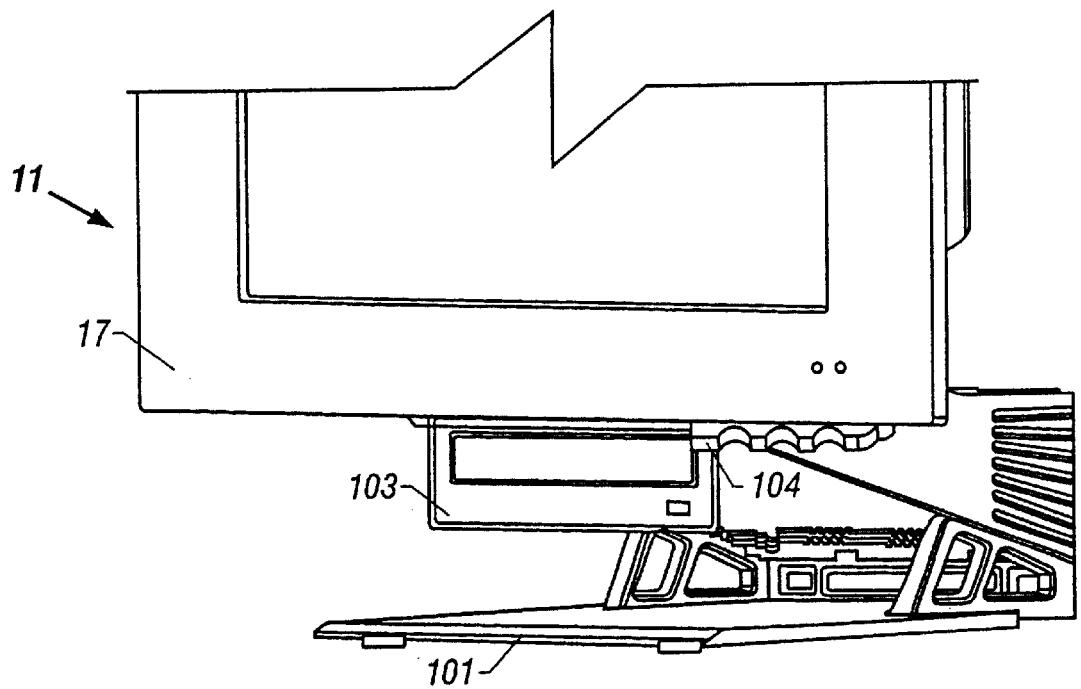
FIG. 24 is a partial front isometric view of the computer with a drive in an accessible position.
Figure 25:
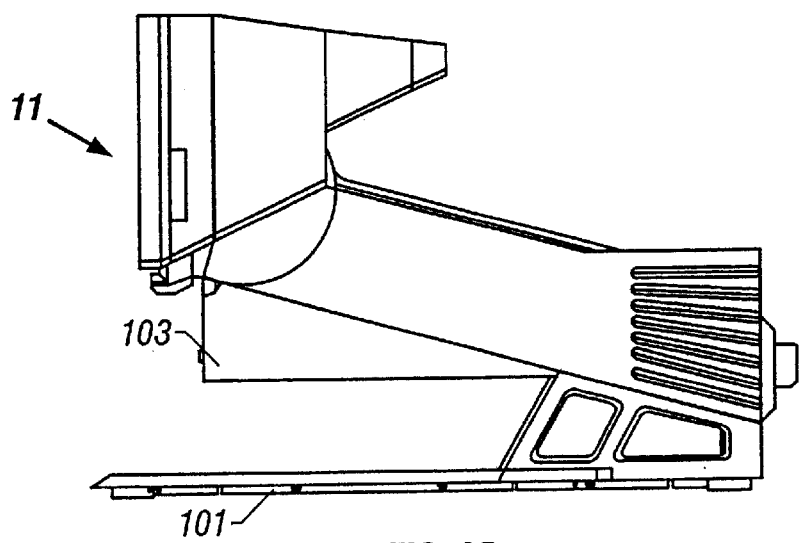
FIG. 25 is a partial side view of the computer and drive of FIG. 24.
Figure 26:
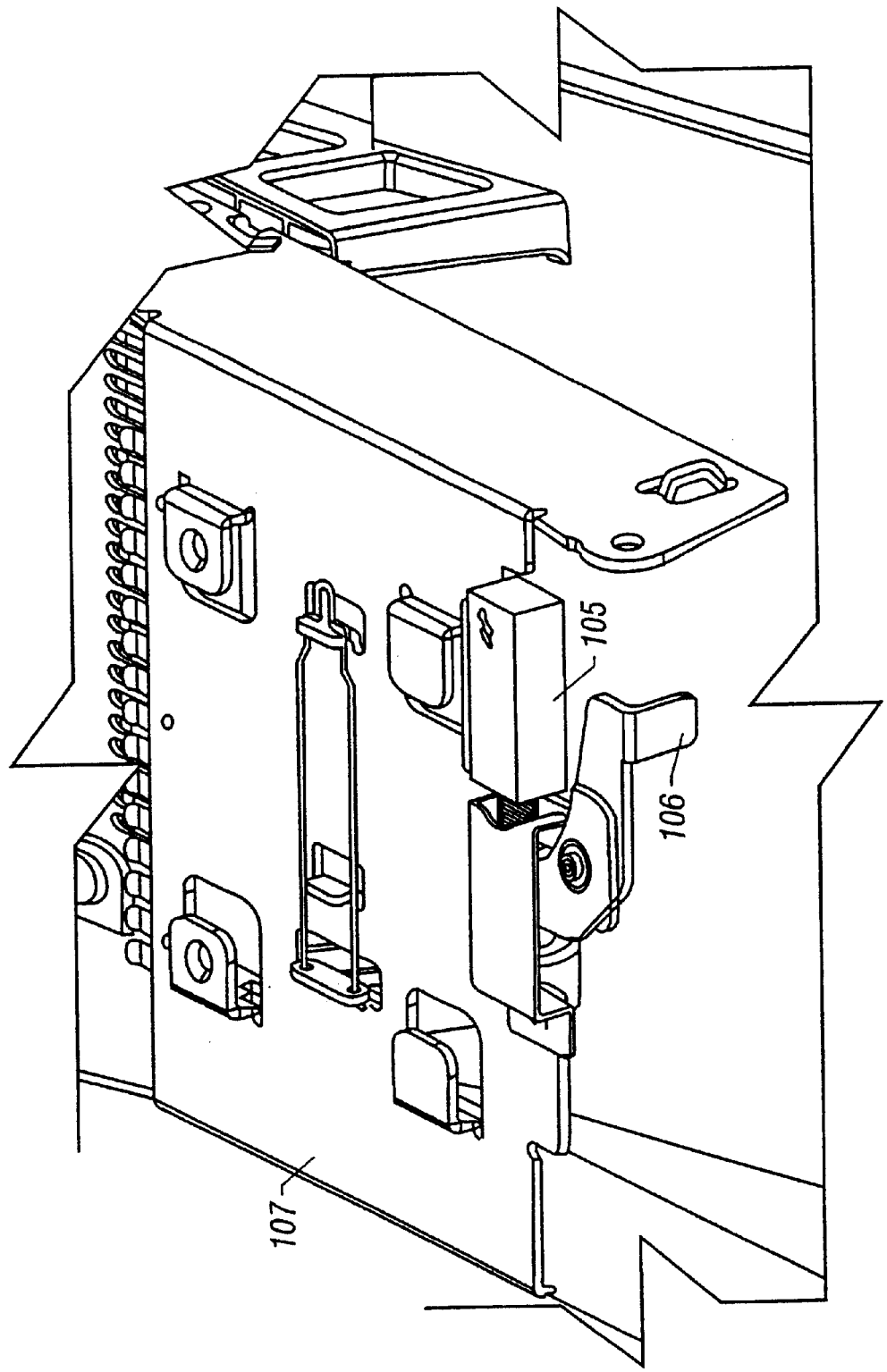
FIG. 26 is an enlarged isometric view of a latching mechanism for the drive.

Referring now to FIGS. 22 and 23, the entire unit of chassis 21 and monitor 17 rest on top of a base 101 that is optimized for industrial design. Base 101 is intended to be as unobtrusive as possible to enable the user with more usable desktop surface. The computer is supported as far back from the user as possible, which requires the foot to carry the resultant load. The foot must be very stiff to carry this load and still be as thin as possible for appearance purposes. Base 101 also counteracts the torsional loads as applied to the top of the monitor undergoing a tilt motion by the user adjusting the screen to suit his or her viewing angle.

Base 101 has an embossed thickness that approximates the torsional stability of a much thicker plate or a series of thin plates made to appear thick to the system. This design successfully dampens the hysteresis of the monitor when the user has established the final tilt position. Base 101 is stiffened with a reverse boss as shown in the drawings to accomplish these objectives.

As shown in FIGS. 24–27, PC 11 has a CD-ROM drive 103 that drops down below monitor 17 via a solenoid-controlled mechanism 105. When not in use, drive 103 is tucked up under monitor 17 in a cage 107 out of the way and out of view of the user (FIG. 1). When the user wishes to utilize drive 103, it can be dropped down below monitor 17 for easy access. This function is accomplished in a small amount of space by the inclusion of a solenoid-operated mechanical release mechanism 105. Mechanism 105 retains a lip of drive 103 until ready to be released or dropped down for use by the user.

Figure 27:
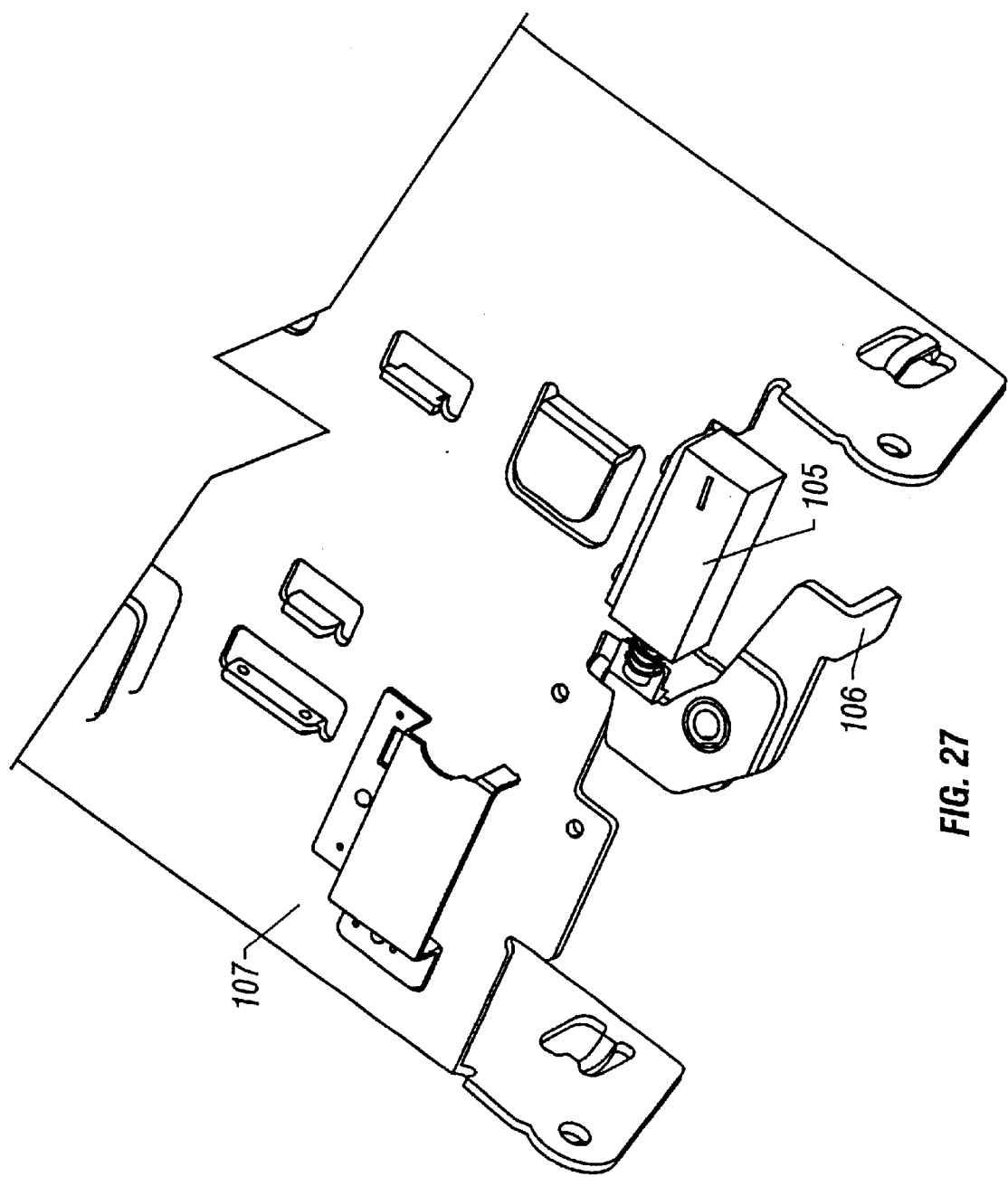
FIG. 27 is an another isometric view of the latching mechanism for the drive.

A button 104 is located on the front of monitor 17 for actuating mechanism 105. Upon pressing the button, mechanism 105 is disengaged and drive 103 drops down for use. Drive 103 is manually pushed back up to the snapped holding position of mechanism 105 for redeployment upon command. There is also a fail-safe kick out of drive 103 should the device be activated while in the "up" position (i.e., the drive is ejected via software). If drive 103 is actuated while it is in the up position, its tray 107 will move out from the front face of drive 103 and activate a lever 106, as seen in FIG. 27. Lever 106 is part of mechanism 105 and, when pushed, drops drive 103 down safely. Otherwise, drive 103 would be stuck in the up position.

In contrast, prior art designs utilized complex mechanical linkages to unlatch the device bay. Due to the multiple degrees of freedom required to link the control button to the latch, the linkage was prone to fail and required a long throw in order to insure that the latch would disengage reliably. It also failed to work uniformly when the monitor was rotated front to back. The control buttons immediately adjacent to the drive bay latch had a short throw, and so had a different tactile feel to it. The part cost was high and assembly was difficult. Furthermore, if the user did not deploy the drive bay before ejecting the device, the drawer of the device would open into the interior of the enclosure and fail. The present design overcomes each of these shortcomings of the prior art.

Figure 28:
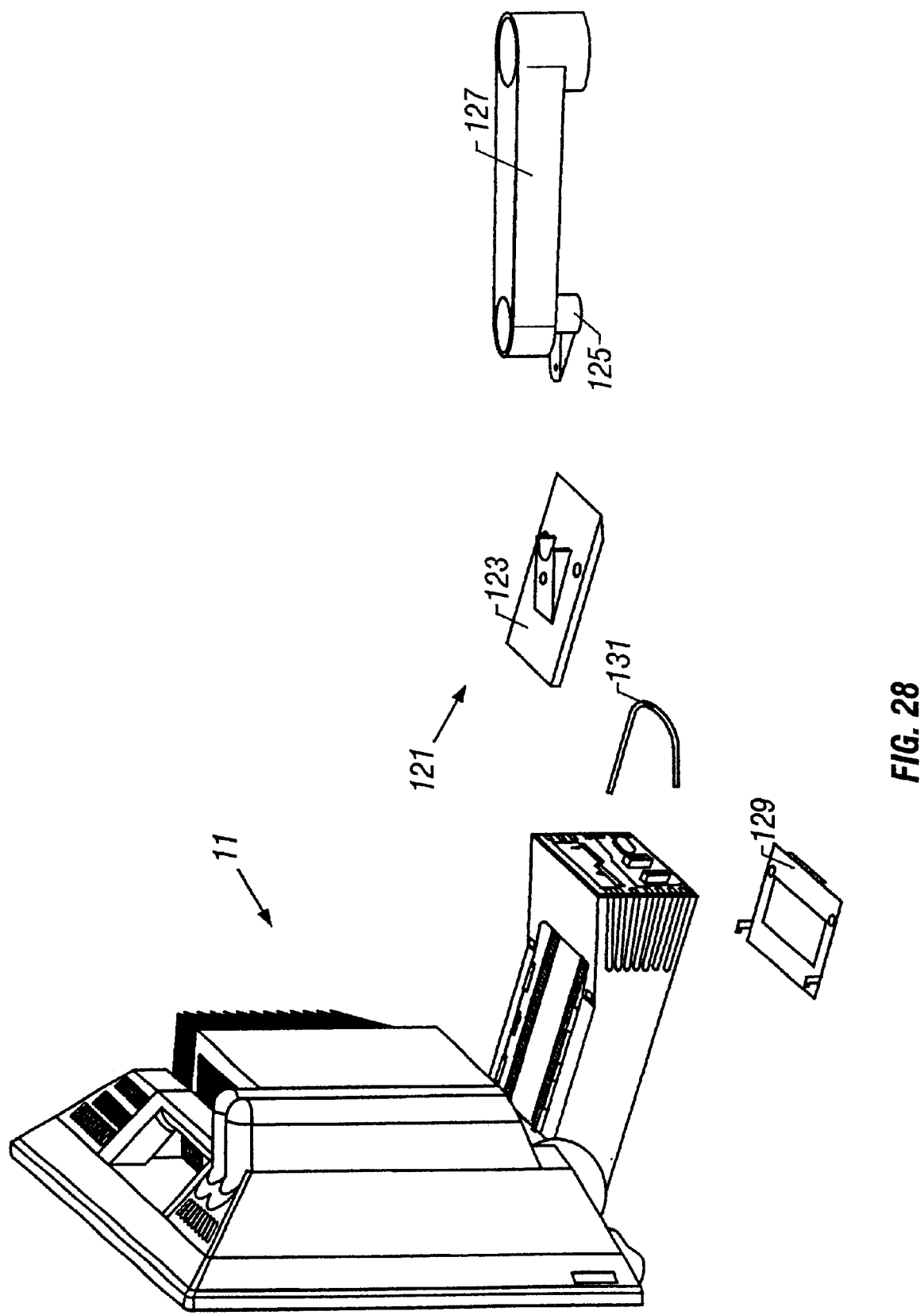
FIG. 28 is an exploded isometric view of the computer and articulated arm.
Figure 29:
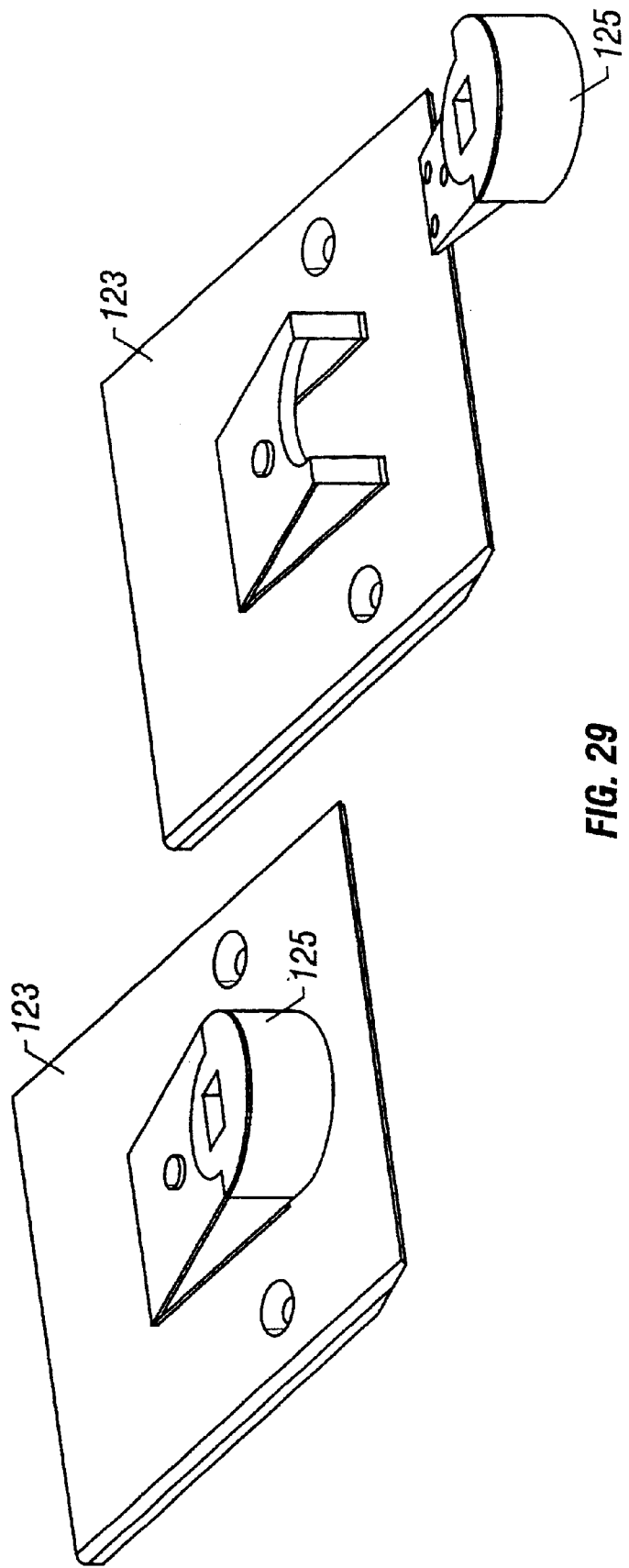
FIG. 29 is an enlarged exploded view of a portion of the articulated arm mount.

Referring now to FIGS. 28-29, an articulated minimalist support assembly 121 for PC 11 is shown. By mounting PC 11 on support assembly 121, a solution for overcrowded user desktops is achieved. This design offers a significant advantage in light of the downsizing of the workplace, the increasing amount of technology that users need to do work, and the shrinking amount of available office and desk space. Computers, terminals, printers, scanners, and other peripheral devices can quickly consume desktop space until there is little space remaining for paper work, notebooks, etc.

Support assembly 121 completely and safely supports PC 11 with a minimal amount of parts that are easily assembled. Support assembly 121 includes an adapter plate 123, an adapter 125, an arm 127, bottom cover 129, and bail 131. Adapter plate 123 is easily attached to PC 11 via screws or other fasteners. Once adapter plate 123 is installed and arm 127 is installed in the user's work space, PC 11 is slidably mounted directly onto the adapter 125 on the end of arm 127 and secured thereto via a hex key or appropriate tool. Bottom cover 129 is installed once the foot of PC 11 is removed. Bail 131 is installed into openings in the rear of PC 11 and bottom cover 129. Bail 131 needs no tools for installation.

Figure 30:
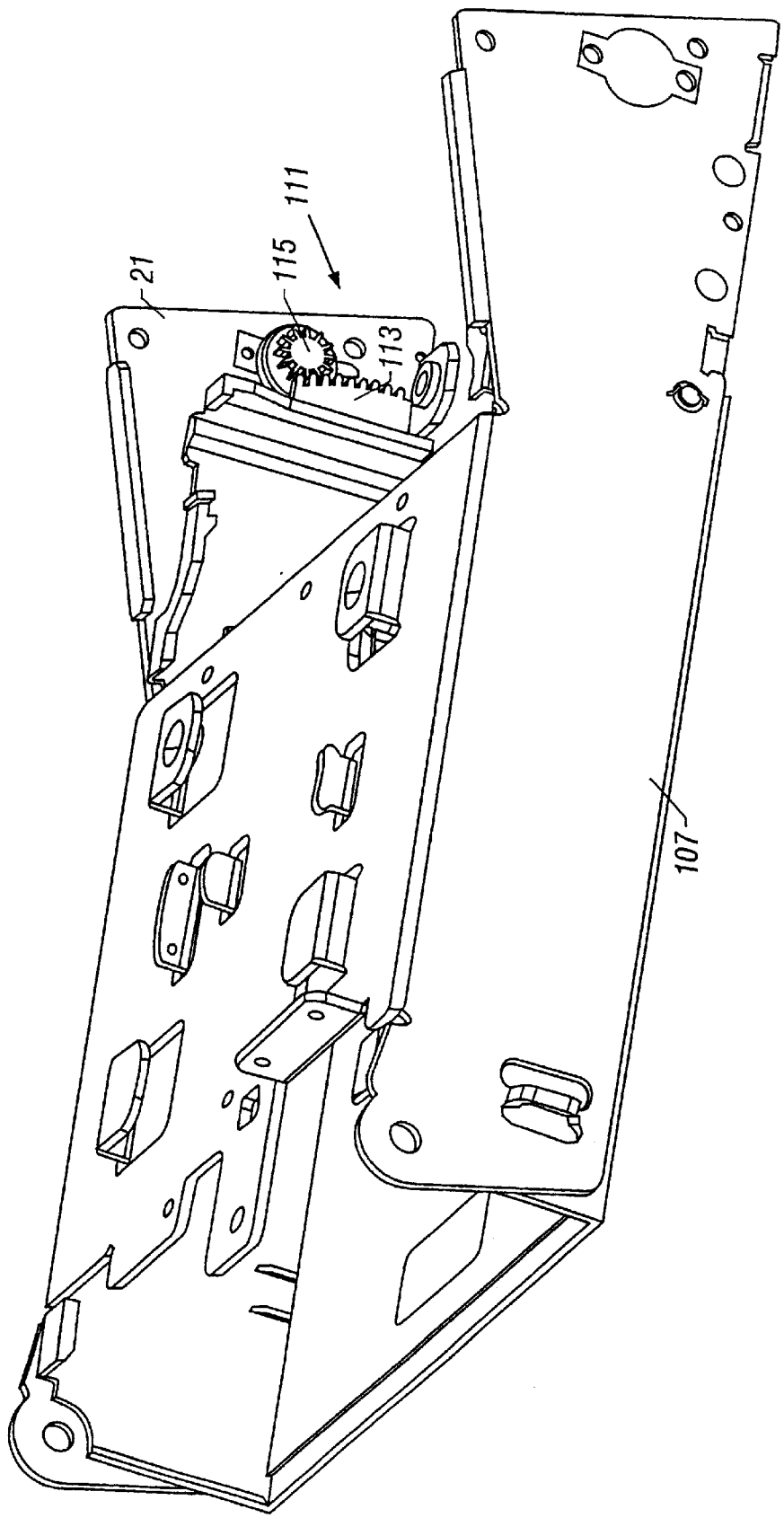
FIG. 30 is an isometric view of a component bay inside the computer chassis with a rack and gear damper.
Figure 31:
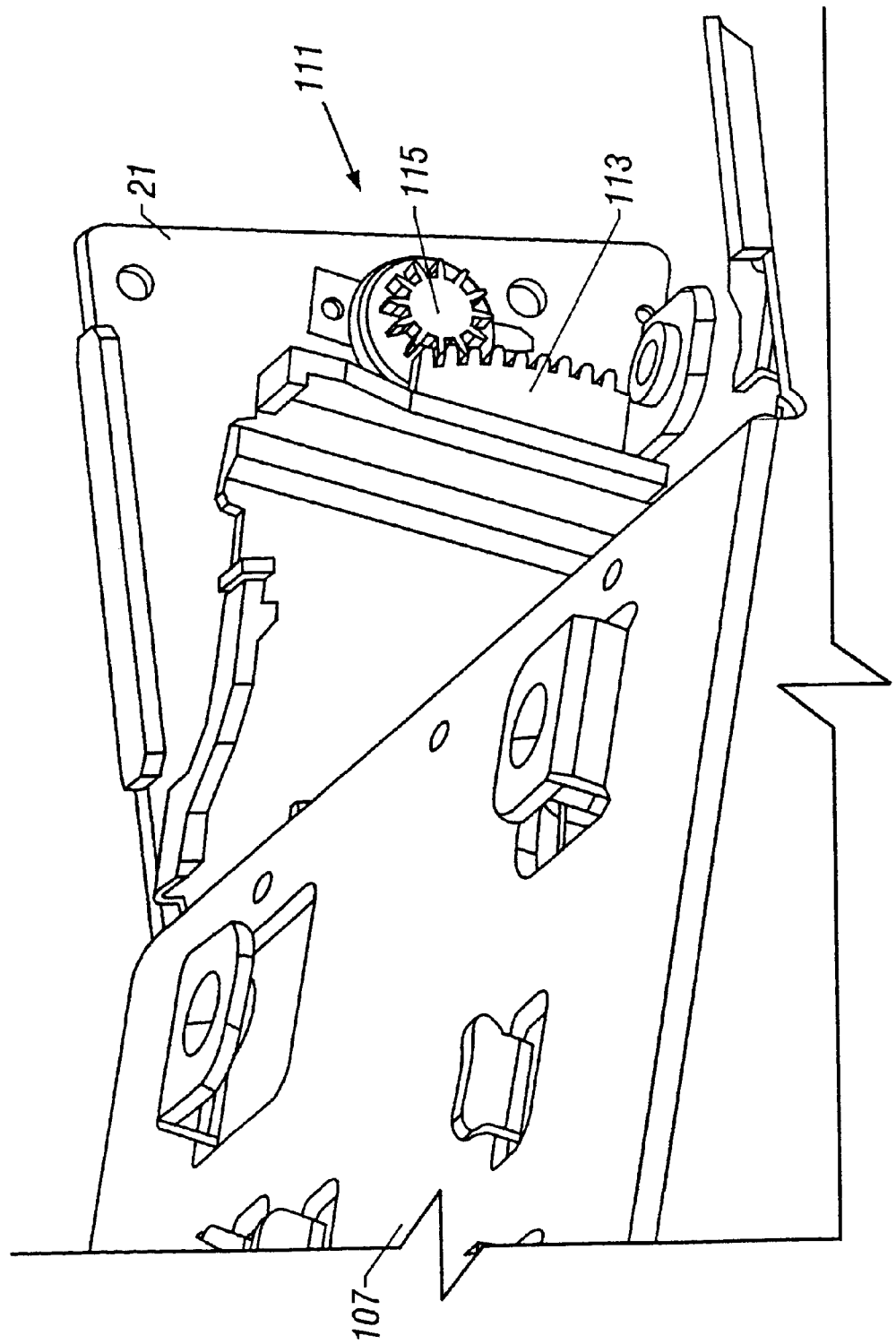
FIG. 31 is an enlarged isometric view of the rack and gear damper.
Figure 32:
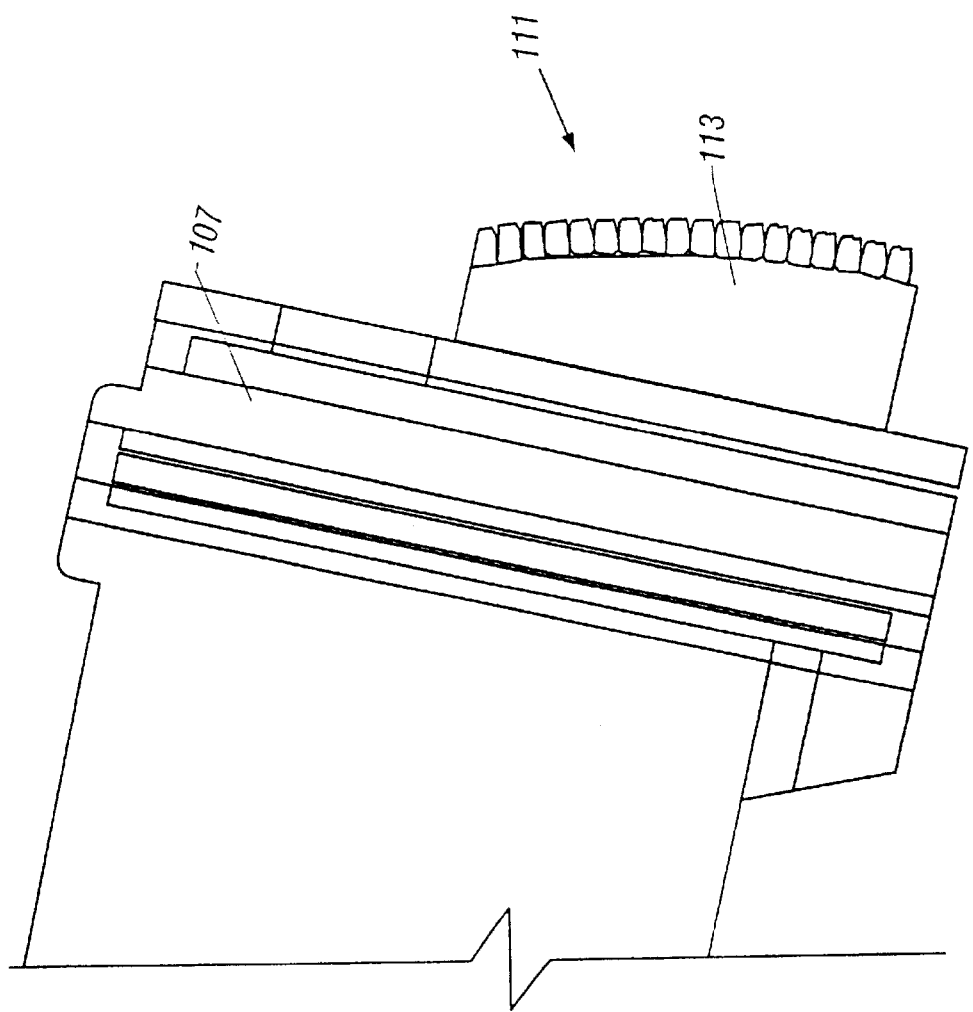
FIG. 32 is an enlarged partial isometric view of the rack and gear damper showing the offset gear teeth.

As shown in FIGS. 30–32, PC 11 is also equipped with an offset gear arrangement 111 for reducing non-linear motion of a component bay, such as cage 107 for drive 103, with respect to the computer chassis 21. This design was required because rotating elements in a mechanical device usually require damping to prevent unnecessary acceleration and/or deceleration of the rotating component. The rotating component is typically provided to enable a service or access to a component that the user would normally prefer to be hidden from view or inaccessible. In the present case, actuation of the rotating device reveals the component to the user. The center of gravity of the component is offset from the axis of rotation and provides the driving torque. The dampers used to control this motion are rotational, and are coupled to the component using a rack 113 and a gear 115. As each gear tooth disengages and the next tooth engages, there is a momentary discontinuity in the transmission of the damping torque, thereby resulting in non-linear motion of the component. Such cogging motion can be very pronounced.

In the present design, two rotational dampers 111 are used, with one on each side of the component, in order to control its motion. Racks 113 engage the teeth on gears 115 of the dampers are offset from each other by one-half tooth pitch. This provides continuous damping torque since one side of the component gear/rack is always fully engaged, while the other side is in transition. The resulting motion of the component is linear and smooth, free from cogging, and has a superior look and feel.

Figure 33:
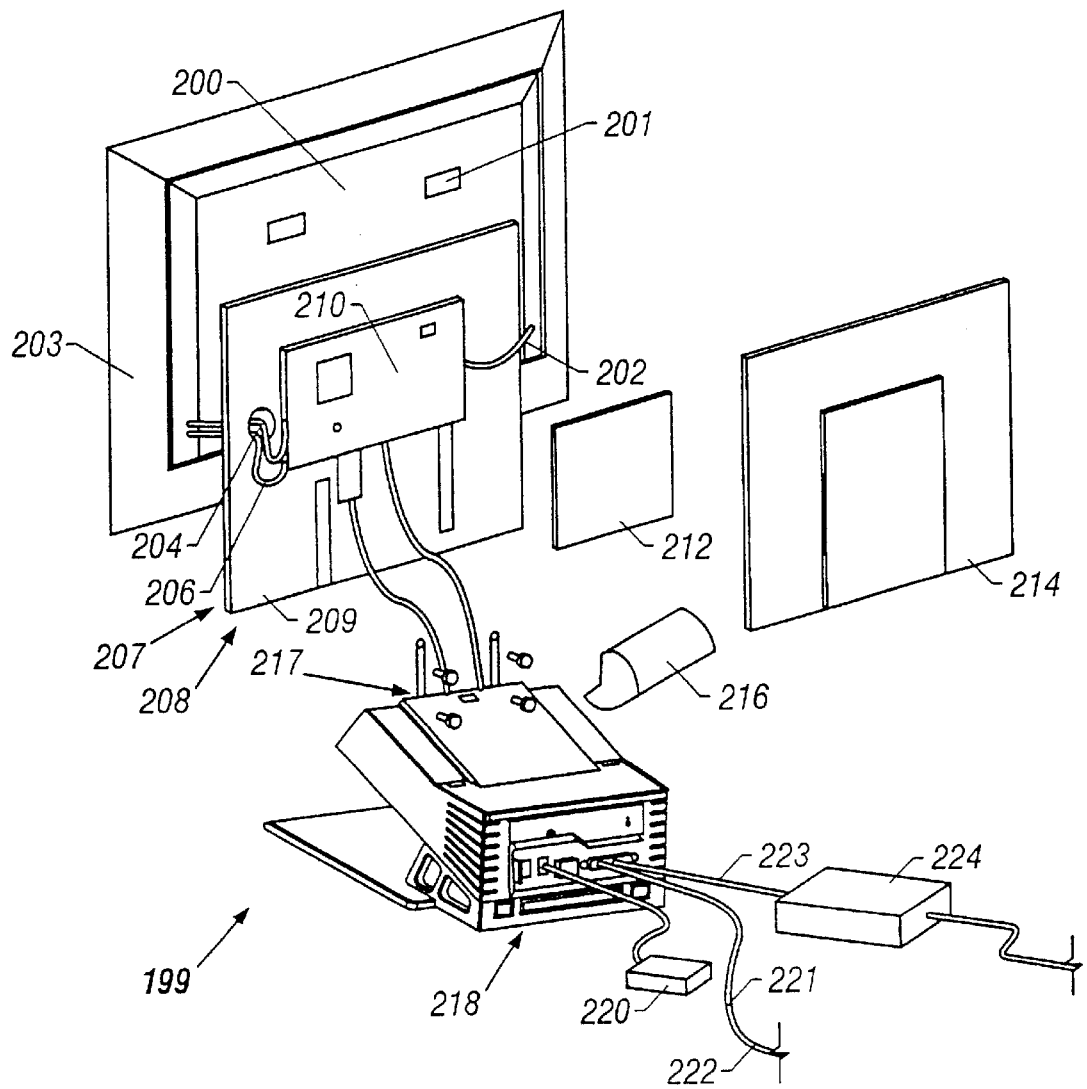
FIG. 33 is an isometric view of the structure of the monitor support structure of an alternate embodiment.

With reference now to the drawings and in particular to FIG. 33, there is illustrated a preferred embodiment of the inventive monitor support structure 199 for physically supporting a flat panel display assembly 200. FIG. 33 further illustrates electrical components, as described in detail below, for providing signal and power electrical interfacing between a traditional PC and flat panel display assembly 200.

The present invention is used to provide support and electrical interfacing to a flat panel display assembly 200 that includes a matrix display (not shown) and a monitor frame 203. In a preferred embodiment, the matrix display utilizes thin film transistor (TFT) technology as readily understood by those skilled in the art of computer monitor displays. In the preferred embodiment, monitor frame 203 includes channels 201, which permit flat panel display assembly 200 to be slidably connected to back plate 208. In the preferred embodiment, back plate 208 has physical dimensions that replicate those of an all-in-one computer from which flat panel display assembly 200 was taken and/or designed. A computer system illustrative of an all-in-one computer system contemplated by the present invention is the IBM® NetVista™ Series. A relevant feature of the IBM® NetVista™ Series is its union of flat panel display assembly 200 with a computer motherboard (not shown) mounted on the back side of flat panel display assembly 200.

In the preferred embodiment, flat panel display assembly 200 slides along channel 201 onto back plate 208, with electrical connection cables described below coming through holes in back plate 208 for ease of connection. Alternatively, flat panel display assembly 200 may be connected to back plate 208 with thumb screws, clamps, snaps, or any other reversible type of connector such that flat panel display assembly 200 is removably connected to back plate 208 of the support structures, preferably without the need to use tools for such assembly.

Stand 218 attaches to back plate 208 to support flat panel display assembly 200 in proper orientation on a desktop. Stand 218 provides a tilt adjustment to permit adjustment of flat panel display assembly 200 to a comfortable viewing angle, and preferably includes hinge cover 216 to cover tilt hinge 217 of stand 218. Back plate 208 includes front side 207 and back side 209. Front side 207 is oriented contiguous with the non-viewable side of flat panel display assembly 200. Back side 209 is oriented contiguous to routing logic device 210, which is mounted on back side 209. Electrically connected between flat panel display assembly 200 and routing logic device 210 are monitor audio cable 202, monitor signal cable 204, and monitor power cable 206. Coming into routing logic device 210 are corresponding video signal cable 220 and audio signal cable 221 from a PC (not shown), plus source power cable 223 from AC/DC power adaptor 224. In the preferred embodiment, back plate 208 has the same dimensions as a mounting plate (not shown) for an all-in-one computer (not shown) for which flat panel display assembly 200 was designed.

To provide protection from radio frequency (RF) and other electromagnetic currents (EMC), EMC shield 212 is oriented circumferentially around and against routing logic device 210. To provide electrical safety and aesthetic improvement, rear cover 214 covers and is connected to back plate 208, thus covering routing logic device 210 and EMC shield 212.

Figure 34:
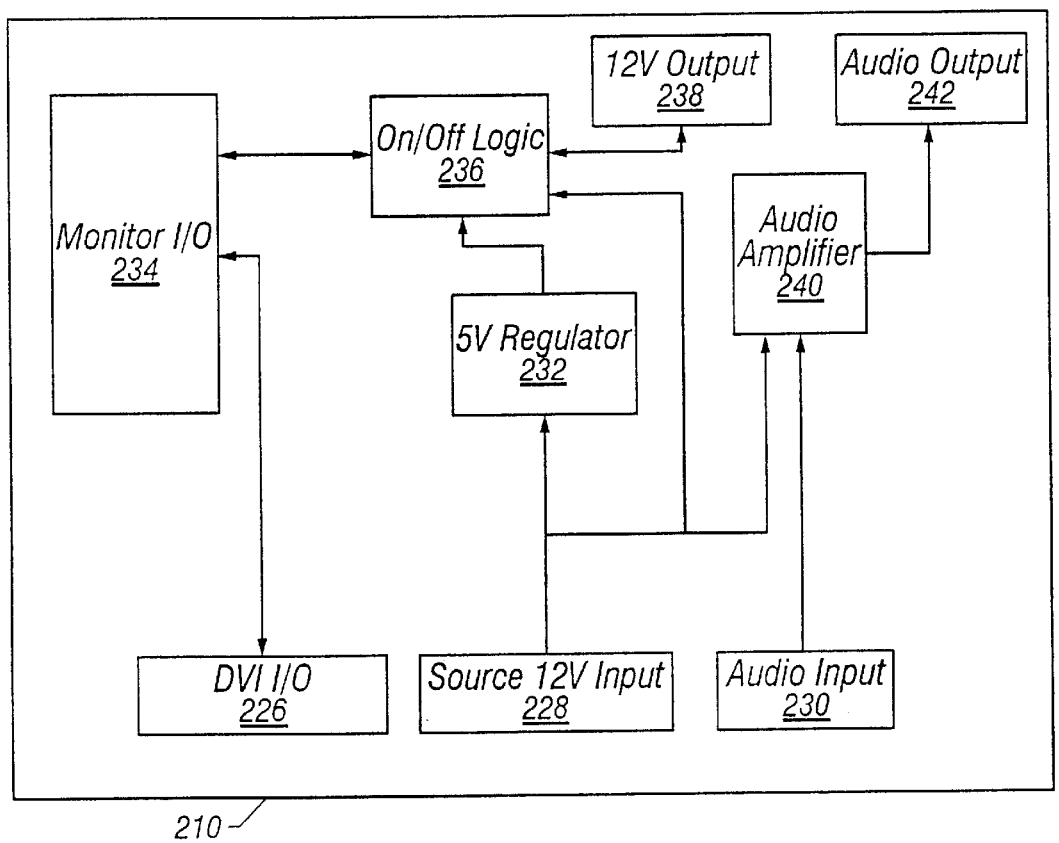
FIG. 34 is a bock diagram of an electrical routing logic device for electrically connecting a flat panel monitor to an existing computer system.
Figure 35:
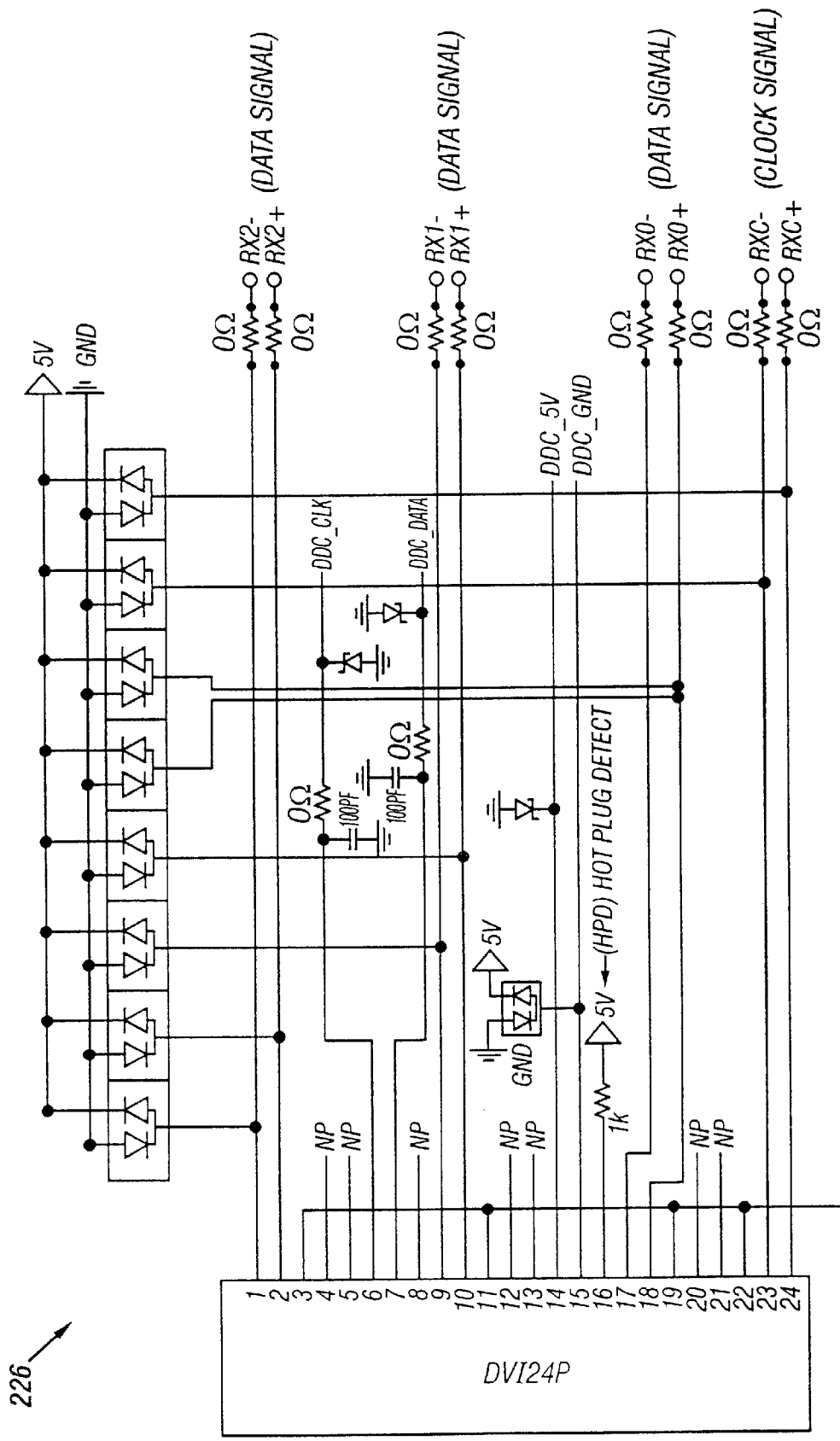
FIG. 35 is a circuit diagram illustrating a preferred embodiment of an electrical interfacing between a Digital Video Interactive (DVI) signal cable to the routing logic device.
Figure 36:
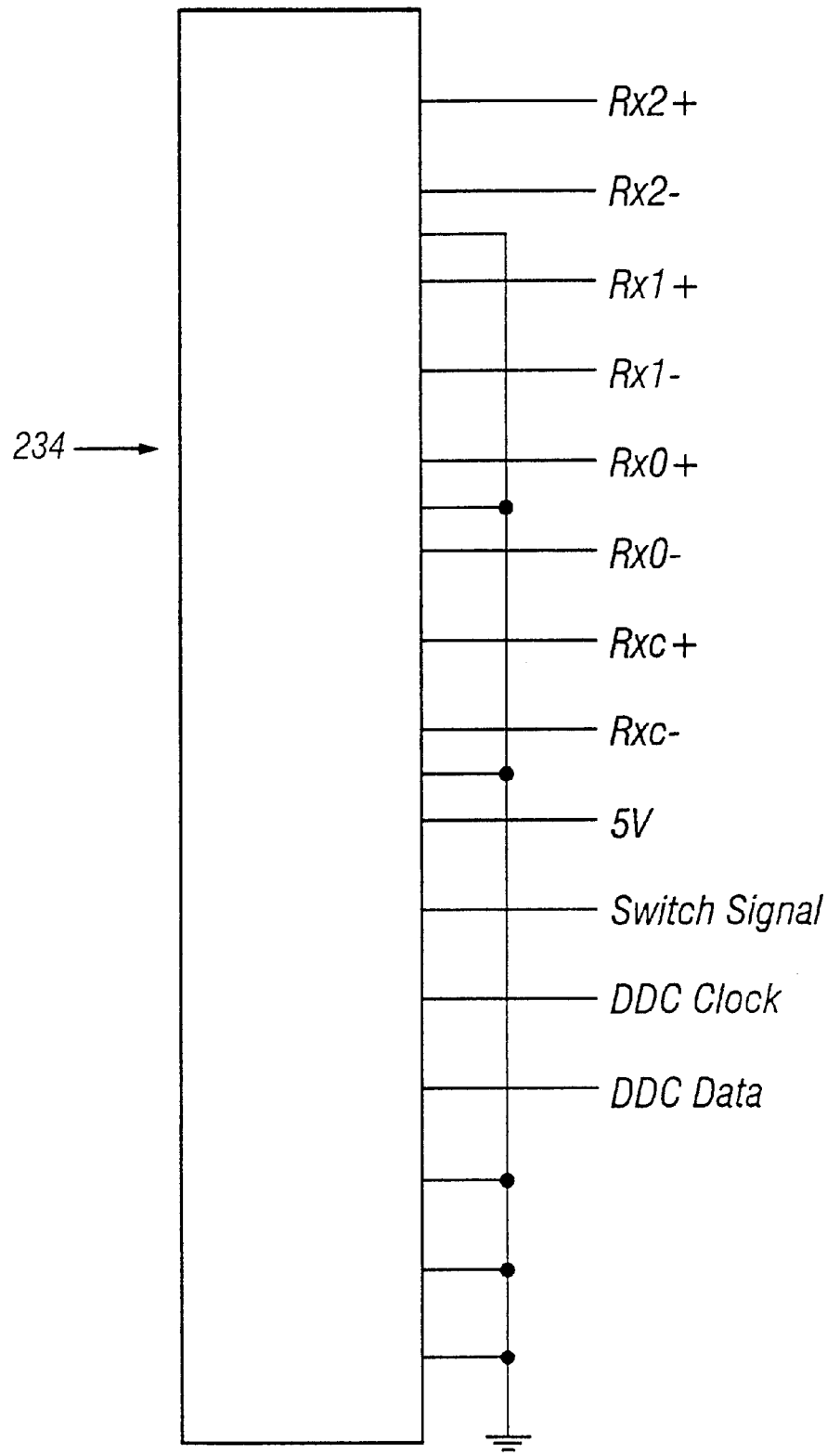
FIG. 36 is a circuit diagram depicting a preferred embodiment of the interface between the routing logic device and the flat panel monitor.

Reference is now made to FIG. 34, a block diagram of hardware components in routing logic device 210. In the preferred embodiment, routing logic device 210 is uniquely configured to drive a flat panel display assembly 200. Input form video signal cable 220 interfaces with digital video interactive (DVI) input/output (I/O) 226. The video signal is communicated electrically, preferably under a transition minimized differential signaling protocol, from DVI I/O 226 to monitor I/O 234. In a preferred embodiment, DVI I/O 236 is depicted in FIG. 35, using a DVI 24-pin I/O interface. A preferred embodiment of monitor I/O 234 is illustrated in FIG. 36, utilizing a Hirose™ 25-pin interface. In the preferred embodiment, the connection between DVI I/O 226 and monitor I/O 234 is Digital Display Working Group (DDWG) compliant, allowing hot switching, wherein monitor signal cable 204 can be plugged into monitor I/O 234 without harming the circuitry found in either flat panel display assembly 200 or routing logic device 210.

Figure 37:
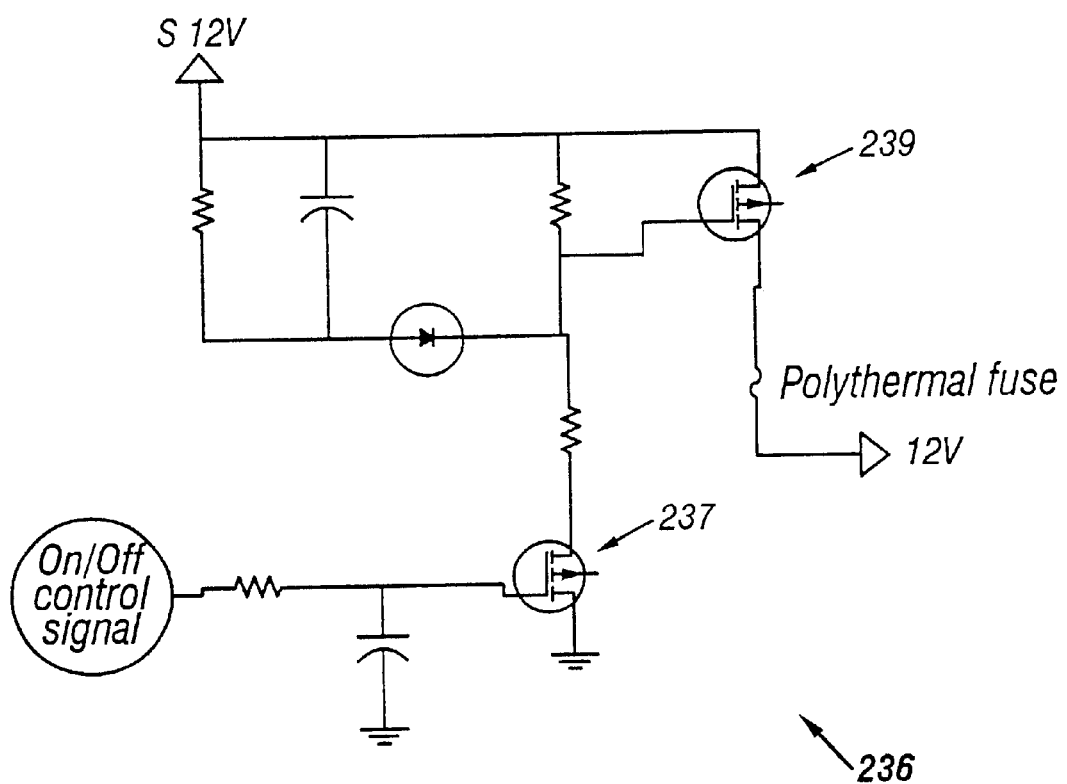
FIG. 37 is a circuit diagram illustrating a preferred embodiment of the on/off logic device for connecting power via the routing logic card to the flat panel monitor.

Connected to monitor I/O 234 is on/off logic device 236, shown in a preferred embodiment in FIG. 37. On/off logic device 236 includes power field effect transistors (FET) 237 and 239 to switch power on and off to 12-volt output 238. Also connected to on/off logic device 236 is a 12-volt output 238, which connects to monitor power cable 206.

Figure 38:
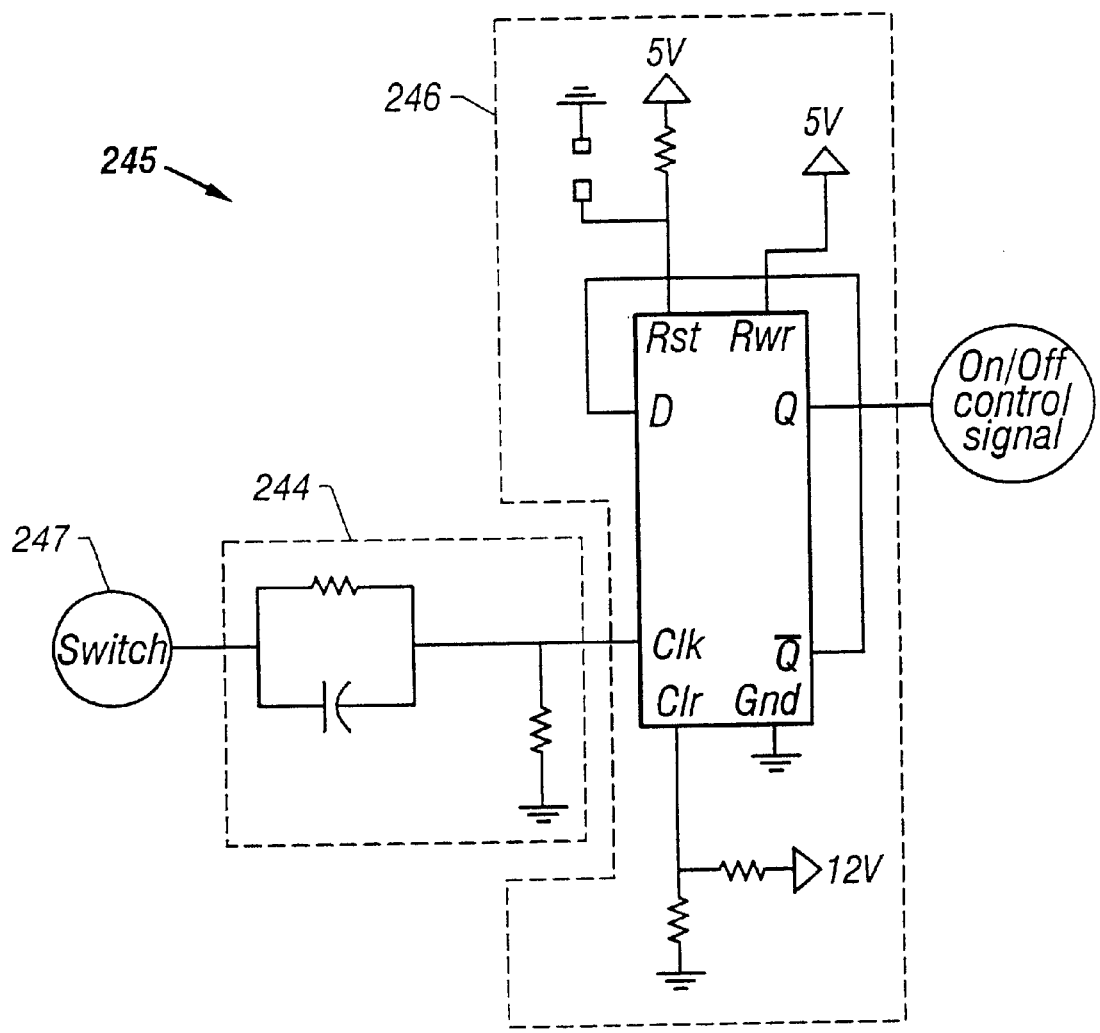
FIG. 38 is a circuit diagram depicting a preferred embodiment of an on/off switch connected to the flat panel monitor.

FIG. 38 illustrates a preferred embodiment an on/off signal circuit 245, which is preferably connected between push-button switch 247 on flat panel display assembly 200 (not shown) and on/off logic 236. On/off signal circuit 245 includes a debouncer 244 and a latch 246. When push-button switch 247 is pushed a first time, latch 246 allows an "on" signal to reach a selected pin on monitor I/O 234, which passes the on signal to on/off logic device 236, allowing a 12-volt supply to pass from source 12-volt input 228 to 12-volt output 238 and then to flat panel display assembly 200 via monitor power cable 206. Engaging push button switch 247 a second time sends an "off" signal to the same circuitry. Note that logic voltage for I/O logic device 236 is supplied by a 5-volt regulator 232, which converts part of the source 12-volt voltage from source 12-volt input 228 into 5-volts or its equivalent as required by typical logic circuitry.

Routing logic device 210 also includes circuitry for passing audio signals to flat panel display assembly 200, which includes in the preferred embodiment, audio speakers (not shown). An audio signal from a personal computer (not shown) passes through audio signal cable 221 into audio input 230, through audio amplifier 240, and out audio output 242 to monitor audio cable 202 and then to the speakers of flat panel display assembly 200. Audio amplifier 240 using circuitry known in the art takes an audio signal that is typically low power, such as that designed for head phones and amplifies it to a state adequate to drive audio speakers.

Routing logic device 210 thus provides the necessary electronic logic, drivers, and power interfaces for the audiovisual display provided by flat panel display assembly 200 that would have been found in the motherboard of the all-in-one personal computer for which flat panel display assembly 200 was originally used and/or designed. Thus, flat panel display assembly 200 can be recycled for reuse on personal computer systems that do not utilize an all-in-one architecture, thus increasing the economic lifetime of flat panel display assembly 200. Further, in a preferred embodiment, all connections, mechanical and electrical, necessary to connect flat panel display assembly 200 to the described support structure can be performed with the use of any tools. In an alternative embodiment, electrical connection interfaces described above as monitor I/O 234, 12-volt output 238 and audio output 242 are hand connectable to the described corresponding cables going to flat panel display assembly 200.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a support assembly,
   a data display housing,
   information handling elements mounted in said display housing,
   a data display mounted in said housing and operatively connected with said information handling elements, and
   a linkage mounting said display housing on said support assembly for positional adjustment,
   said housing having a cage to hold a drive receiving removable computer readable media and mounted for movement between a stowed position disposed within said housing and an accessible position extending from said housing and a damping mechanism interposed between said cage and said housing to guide cage movement in smooth linear translation, said damping mechanism having a pair of engaged gear sets arranged with the engaged gears of each set displaced rotationally by one half tooth pitch from the other set.

2. Apparatus according to claim 1 where in said support assembly is formed of a thin embossed metallic sheet material having elongate deformations imparting enhanced structural rigidity.

3. Apparatus according to claim 1 further comprising an electrically actuable latch securing said cage in the stowed position and electrically operable to release said cage for movement to the accessible position enabling insertion and removal of computer readable media.

4. Apparatus according to claim 1 wherein said housing has a back cover distal from said data display and mounted for movement between closed and opened positions, a manually actuable latch securing said back cover in closed position and manipulable to release said back cover for movement to the opened position enabling access to said information handling elements, and shielding in said back cover which suppresses emission of radio frequency interference signals.

5. Apparatus according to claim 1 herein said support assembly has an adapter plate and further comprising a support arm affixed to a supporting surface, said support arm and adapter plate cooperating to enable ready joining and disjoining thereof.

6. Apparatus according to claim 1 wherein said housing has a back cover distal from said data display, and further comprising a tubular cable trough removably attached to said back cover and enclosing cables which connect said information handling elements with accessory devices.

7. Apparatus according to claim 1 wherein said housing has a back cover distal from said data display and mounted for movement between closed and opened positions, and a manually actuable latch securing said back cover in closed position and manipulable to release said back cover for movement to the opened position enabling access to said information handling elements, and further wherein said housing has a cage to hold a drive with non-removable computer readable media and mounted for movement between secured and removed positions at a location accessible when said back cover is in the opened position, and a manually actuable latch securing said cage in secured position and manipulable to release said cage for movement to the removed position.

8. Apparatus according to claim 1 wherein said housing has a back cover distal from said data display and mounted for movement between closed and opened positions, and a manually actuable latch securing said back cover in closed position and manipulable to release said back cover for movement to the opened position enabling access to said information handling elements, said housing further having a card retaining clip mounted adjacent an option card connector for movement between a card holding position and a card releasing position and disposed to be restrained against movement to the card releasing position when said back cover is in the close position.

9. Apparatus comprising:
   a support assembly having a front and a rear,
   a data display housing,
   information handling elements mounted in said display housing,
   a data display mounted in said housing and operatively connected with said information handling elements, and
   a linkage mounting said display housing to the rear of said support assembly for positional adjustment, said housing being arranged to extend above the front of said support assembly, where said data display is mounted,
   said housing having a cage holding a drive receiving removable computer readable media which cage is mounted for movement between a stowed position disposed within said housing behind said data display and an accessible position extending from said housing below said data display and having an electrically actuable latch securing said cage in the stowed position which is electrically operable to release said cage for movement to the accessible position enabling insertion and removal ot computer readable media.

10. Apparatus comprising:
    a support arm affixed to a supporting surface,
    a support assembly formed of a thin embossed metallic sheet material having elongate deformations imparting enhanced structural rigidity and having an adapter plate secured to said support arm, said support arm and adapter plate cooperating to enable ready joining and disjoining thereof, a data display housing, information handling elements mounted in said display housing including a connector receiving an option card, a data display mounted in said housing and operatively connected with said information handling elements, a linkage mounting said display housing on said base for positional adjustment, and a tubular cable trough removably attached to said back cover and enclosing cables which connect said information handling elements with accessory devices, said housing having a back cover distal from said data display and mounted for movement between closed and opened positions, and manually actuable latch securing said back cover in closed position and manipulable to release said back cover for movement to the opened position enabling access to said information handling elements and integrally formed shielding suppressing emission of radio frequency interference signals, said housing further having a first cage to hold a drive receiving removable computer readable media and mounted for movement between a stowed position disposed within said housing and an accessible position extending from said housing, an electrically actuable latch securing said first cage in the stowed position and electrically operable to release said cage for movement to the accessible position enabling insertion and removal of computer readable media, and a damping mechanism interposed between said first cage and said housing to guide cage movement in smooth linear translation, said damping mechanism having a pair of engaged gear sets arranged with the engaged gears of each set displaced rotationally by one half tooth pitch from the other set, said housing further having a second cage to hold a drive with a non-removable computer readable media and mounted for movement between secured and removed positions at a location accessible when said back cover is in the opened position, and a manually actuable latch securing said second cage in secured position end manipulable to release said second cage for movement to the removed position, said housing further having a card retaining clip mounted adjacent said connector for movement between a card holding position and a card releasing position and disposed to be restrained against movement to the card releasing position when said back cover is in the closed position.

* * * * *